US012559976B2

(12) United States Patent
Caterino

(10) Patent No.: US 12,559,976 B2
(45) Date of Patent: Feb. 24, 2026

(54) DOOR LOCK DETECTION SYSTEMS AND METHODS

(71) Applicant: ASSOY ABLOY Residential Group, Inc., New Haven, CT (US)

(72) Inventor: Mark Caterino, Prospect, CT (US)

(73) Assignee: ASSOY ABLOY Residential Group, Inc., New Haven, CT (US)

( * ) Notice: Subject to any disclaimer, the term of this patent is extended or adjusted under 35 U.S.C. 154(b) by 0 days.

(21) Appl. No.: 18/482,495

(22) Filed: Oct. 6, 2023

(65) Prior Publication Data

US 2024/0183195 A1 Jun. 6, 2024

Related U.S. Application Data

(63) Continuation of application No. 15/946,811, filed on Apr. 6, 2018, now Pat. No. 11,808,056.

(60) Provisional application No. 62/486,754, filed on Apr. 18, 2017.

(51) Int. Cl.

| | |
|---|---|
| ***E05B 47/00*** | (2006.01) |
| ***E05B 15/02*** | (2006.01) |
| ***E05B 39/00*** | (2006.01) |
| ***E05B 47/02*** | (2006.01) |

(52) U.S. Cl.

CPC .......... *E05B 47/0001* (2013.01); *E05B 15/02* (2013.01); *E05B 15/0205* (2013.01); *E05B 39/00* (2013.01); *E05B 47/026* (2013.01); *E05B 47/0012* (2013.01); *E05B 2047/0052* (2013.01); *E05B 2047/0067* (2013.01); *E05B 2047/0069* (2013.01); *E05B 2047/0097* (2013.01)

(58) Field of Classification Search

None

See application file for complete search history.

(56) References Cited

U.S. PATENT DOCUMENTS

| | | | |
|---|---|---|---|
| 2,181,313 | A | 11/1939 | Blodgett |
| 2,353,844 | A | 7/1944 | Milner |
| 2,484,571 | A | 10/1949 | Jozefowicz |
| 2,869,913 | A | 1/1959 | Schlage |
| 3,148,524 | A | 9/1964 | Yulkowski |

(Continued)

FOREIGN PATENT DOCUMENTS

| | | | |
|---|---|---|---|
| AU | 2007219334 | A1 | 4/2008 |
| DE | 19639253 | A1 | 11/1997 |

(Continued)

OTHER PUBLICATIONS

International Preliminary Report on Patentability for International Application No. PCT/US2018/062738, dated Jun. 18, 2020.

(Continued)

*Primary Examiner* — Alyson M Merlino

(74) *Attorney, Agent, or Firm* — Calfee, Halter & Griswold LLP

(57) ABSTRACT

Systems and methods for detecting whether a door lock bolt is engaged with a door jamb recess in a locked position are provided. Certain of the systems and methods described herein detect engagement between a door lock bolt and door jamb recess using a motor current signature. Certain of the systems and methods described herein detect engagement between a door lock bolt and door jamb recess using a bolt vibration signature.

20 Claims, 21 Drawing Sheets

(56) References Cited

U.S. PATENT DOCUMENTS

| | | | | |
|---|---|---|---|---|
| 4,389,061 | A * | 6/1983 | Foshee | E05B 59/00 292/169.14 |
| 4,595,220 | A | 6/1986 | Hanchett, Jr. | |
| 4,657,206 | A | 4/1987 | Matsumoto et al. | |
| 4,674,776 | A | 6/1987 | James | |
| 4,744,021 | A | 5/1988 | Kristy | |
| 4,870,841 | A | 10/1989 | Cudd | |
| 4,890,870 | A | 1/1990 | Miron | |
| 4,945,737 | A | 8/1990 | Hart | |
| 4,950,005 | A | 8/1990 | Cudd | |
| 5,267,457 | A | 12/1993 | Sorensen et al. | |
| 5,377,513 | A | 1/1995 | Miyamoto et al. | |
| 5,678,870 | A | 10/1997 | Pelletier | |
| 5,712,626 | A | 1/1998 | Andreou | |
| 5,918,916 | A | 7/1999 | Kajuch | |
| 5,933,086 | A | 8/1999 | Tischendorf | |
| 5,941,581 | A | 8/1999 | Heithe | |
| 6,212,923 | B1 | 4/2001 | Clark | |
| 6,302,456 | B1 | 10/2001 | Errani | |
| 6,578,888 | B1 | 6/2003 | Fayngersh et al. | |
| 7,007,985 | B2 | 3/2006 | Alexander et al. | |
| 7,155,946 | B2 | 1/2007 | Lee et al. | |
| 7,303,215 | B2 | 12/2007 | Moon et al. | |
| 7,431,354 | B2 | 10/2008 | Raatikainen | |
| 7,866,713 | B2 | 1/2011 | Chen | |
| 8,494,680 | B2 | 7/2013 | Sparenberg | |
| 9,322,201 | B1 | 4/2016 | Cheng | |
| 9,326,094 | B2 | 4/2016 | Johnson | |
| 9,382,739 | B1 | 7/2016 | Johnson | |
| 9,447,609 | B2 | 9/2016 | Johnson | |
| 9,528,294 | B2 | 12/2016 | Johnson | |
| 9,574,372 | B2 | 2/2017 | Johnson | |
| 9,580,934 | B2 | 2/2017 | Baty | |
| 9,683,392 | B1 | 6/2017 | Cheng | |
| 10,329,801 | B2 | 6/2019 | Martin | |
| 10,400,476 | B2 | 9/2019 | Grillo | |
| 10,508,472 | B2 | 12/2019 | Piantek | |
| 10,704,293 | B2 | 7/2020 | Almomani | |
| 10,742,142 | B2 | 8/2020 | Forsberg et al. | |
| 11,136,790 | B2 | 10/2021 | Caterino et al. | |
| 2002/0101083 | A1 | 8/2002 | Toledano et al. | |
| 2002/0145292 | A1 | 10/2002 | Furner | |
| 2003/0045330 | A1 | 3/2003 | DeWald et al. | |
| 2003/0127866 | A1 | 7/2003 | Martinez et al. | |
| 2003/0226384 | A1 | 12/2003 | Shedd et al. | |
| 2004/0045330 | A1* | 3/2004 | Moon | E05B 47/0673 70/107 |
| 2005/0046198 | A1 | 3/2005 | Alexander et al. | |
| 2006/0123859 | A1 | 6/2006 | Gonzalez | |
| 2009/0151407 | A1 | 6/2009 | Lin | |
| 2009/0151408 | A1 | 6/2009 | Petry | |
| 2012/0167646 | A1 | 7/2012 | Sharma et al. | |
| 2013/0192317 | A1 | 8/2013 | McKibben | |
| 2014/0109632 | A1 | 4/2014 | Horne et al. | |
| 2016/0037306 | A1 | 2/2016 | Johnson | |
| 2016/0049024 | A1 | 2/2016 | Johnson | |
| 2016/0189503 | A1 | 6/2016 | Johnson et al. | |
| 2017/0152679 | A1 | 6/2017 | Almomani et al. | |
| 2017/0228603 | A1 | 8/2017 | Johnson | |
| 2017/0362856 | A1 | 12/2017 | Almomani et al. | |
| 2018/0320414 | A1 | 11/2018 | Piantek | |
| 2019/0178005 | A1 | 6/2019 | Caterino et al. | |
| 2020/0123808 | A1 | 4/2020 | Lovejoy et al. | |

FOREIGN PATENT DOCUMENTS

| | | | |
|---|---|---|---|
| DE | 10209037 | A1 | 10/2003 |
| FR | 404777 | A | 12/1909 |
| FR | 623497 | A | 6/1927 |
| KR | 200322402 | Y1 | 8/2003 |
| KR | 20110024915 | A | 3/2011 |
| WO | 2015058252 | A1 | 4/2015 |

OTHER PUBLICATIONS

International Preliminary Report on Patentability for International Application No. PCT/US2018/031391, dated Nov. 21, 2019.

International Search Report and Written Opinion dated Aug. 29, 2018 in connection with International Application No. PCT/US2018/ 028066.

Invitation to Pay Additional Fees dated Jun. 27, 2018 in connection with International Application No. PCT/US2018/028066.

International Search Report and Written Opinion for International Application No. PCT/US2018/062738, dated Feb. 11, 2019.

International Search Report and Written Opinion for International Application No. PCT/US2018/031391, dated Aug. 9, 2018.

U.S. Appl. No. 16/202,465, filed Nov. 28, 2018, Caterino et al.

U.S. Appl. No. 15/913,322, filed Mar. 6, 2018, Piantek.

U.S. Appl. No. 16/520,056, filed Jul. 23, 2019, Lovejoy et al.

PCT/US2018/062738, dated Feb. 11, 2019, International Search Report and Written Opinion.

PCT/US2018/031391, dated Aug. 9, 2018, International Search Report and Written Opinion.

* cited by examiner

DOOR LOCK DETECTION SYSTEMS AND METHODS

CROSS-REFERENCE TO RELATED APPLICATIONS

This application is a continuation of U.S. application Ser. No. 15/946,811, titled "DOOR LOCK DETECTION SYSTEMS AND METHODS", filed on Apr. 6, 2018, issued as U.S. Pat. No. 11,808,056, which claims the benefit of U.S. Provisional Application Ser. No. 62/486,754, titled "DOOR LOCK DETECTION SYSTEMS AND METHODS", filed on Apr. 18, 2017, the contents of each of which is incorporated herein in its entirety.

TECHNICAL FIELD

Systems and methods for detecting whether a door is locked are generally described.

BACKGROUND

Home security systems often utilize a smart lock to monitor and alert an operator as to the security state of the door. Some locks may be remotely locked or unlocked. Existing deadbolt systems are able to detect whether a bolt of the deadbolt is extended or retracted. However, such systems may be unable to detect whether the bolt is actually engaged with the door jamb.

SUMMARY

According to one aspect, a door lock detection system for detecting whether a door lock bolt is engaged with a door jamb in a locked position is provided. The system may include a door lock bolt movable between a retracted position and an extended position. The system may also include a strike plate assembly comprising an opening for receiving the bolt. The system may also include a force applicator configured to apply a force to the bolt as the bolt moves through the opening, a motor coupled to the bolt for moving the bolt between the retracted position and the extended position, and a current sensor configured to sense current of the motor as the bolt is driven by the motor from the retracted position to the extended position.

According to another aspect, a method of detecting whether a door lock bolt is engaged with a door jamb in a locked position is provided. The method may include driving a door lock bolt with a motor through an opening of a door jamb recess against a force applied to the bolt by a force applicator. The method may also include sensing, with a current sensor, current of the motor relative to bolt position as the bolt is driven by the motor through the opening against the force. The method may also include comparing the sensed current of the motor relative to bolt position to an expected current signature and determining that the bolt is engaged with the door jamb recess in a locked position when the sensed current of the motor relative to bolt position is within a threshold amount of the expected current signature.

According to yet another aspect, a door lock detection system for detecting whether a door lock bolt is engaged with a door jamb in a locked position is provided. The system may include a door lock bolt movable between a retracted position and an extended position. The system may also include a strike plate assembly comprising an opening for receiving the bolt. The system may also include a vibration applicator configured to apply a vibration to the bolt as the bolt moves through the opening and a vibration sensor configured to sense vibration of the bolt relative to bolt position as the bolt is moved from the retracted position to the extended position.

According to another aspect, a method of detecting whether a door lock bolt is engaged with a door jamb in a locked position is provided. The method may include moving a door lock bolt through an opening of a door jamb recess and applying a vibration to the bolt as the bolt moves through the opening. The method may also include sensing, with a vibration sensor, a sensed vibration of the bolt relative to bolt position as the bolt moves through the opening. The method may also include comparing the sensed vibration relative to bolt position to an expected vibration signature and determining that the bolt is engaged with the door jamb recess in a locked position when the sensed vibration relative to bolt position is within a threshold amount of the expected vibration signature.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
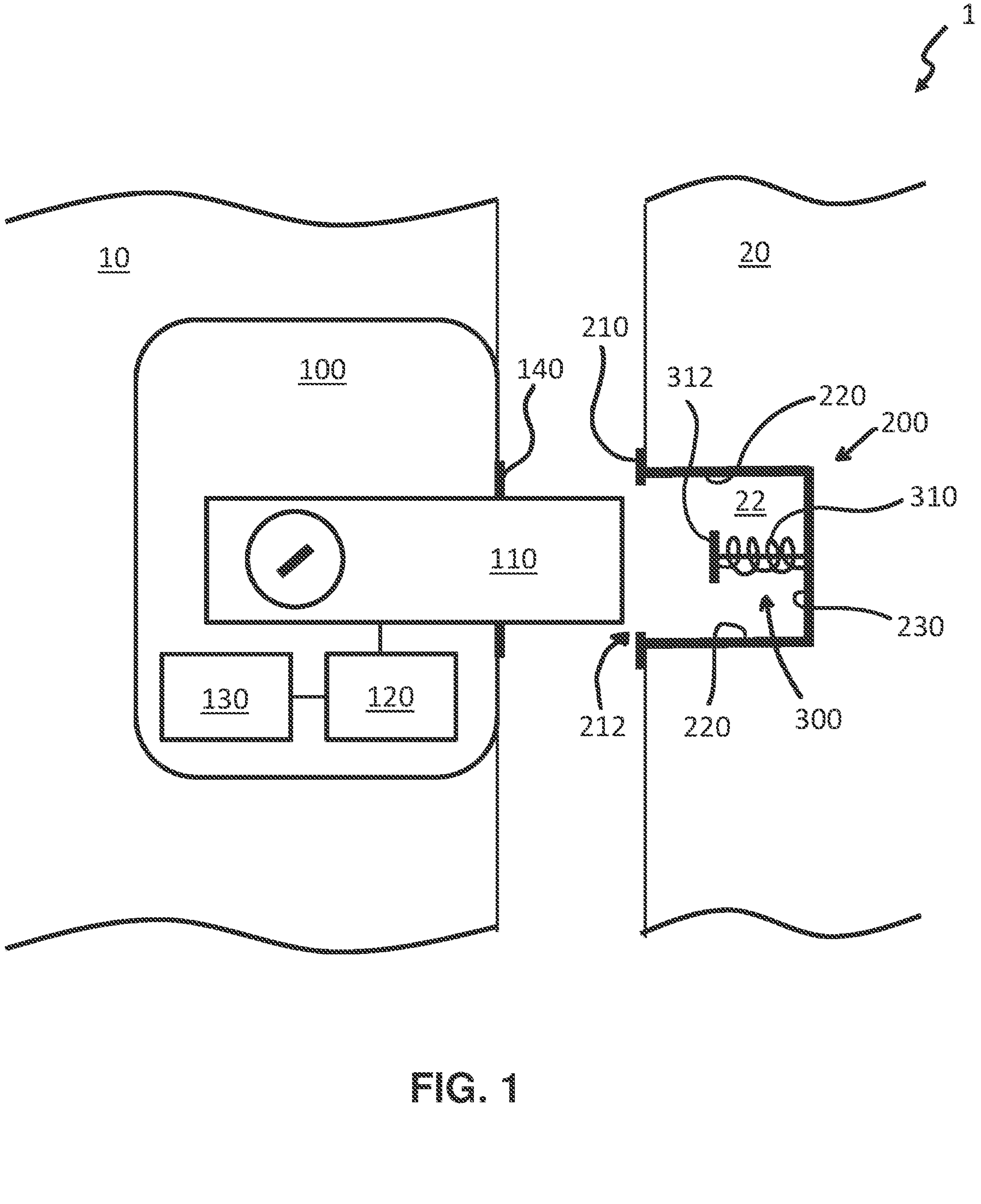
FIG. 1 depicts one embodiment of a door lock detection system according to some aspects.

The inventors have appreciated that common existing lock detection systems do not detect actual engagement of the door lock bolt with the door jamb recess when determining the state of the lock (i.e., whether the lock is locked or open). For example, reed switches operate by detecting the proximity of a magnet on a door to the reed switch contact on the door jamb. The reed switch arrangement does not actually detect whether the door lock bolt has entered the door jamb recess. Instead, the reed switch arrangement assumes that, if a magnetic field is detected by the reed switch contact, the door must be closed, and if no magnetic field is detected, or a weaker magnetic field is detected, the door must be open.

The inventors have recognized that such arrangements can be easily defeated. For example, reed switches can be defeated by bringing a magnet within range of the reed switch contact. Because the reed switch cannot discriminate between the actual magnet on the door and a separate magnet introduced by, for example, an intruder, the reed switch can be an unreliable security measure. Furthermore, the reed switch cannot be used to detect whether the door lock bolt is in the fully extended position and whether the bolt is engaged with the door jamb recess. The conventional reed switch arrangement is only used to detect whether a door is open or closed.

In another system, the magnetic field of a magnet positioned in the door jamb recess is monitored to determine the state of the door.

The inventors have recognized the need for a reliable, simple lock detection system that can detect whether a door is actually locked.

Described herein are lock detection systems and methods for detecting whether a door lock bolt (e.g., a dead bolt) is actually engaged with a door jamb recess in a locked position.

Motor Current Signature

According to one aspect, a door lock detection system may use a motor current signature to determine whether the door lock bolt has engaged with a door jamb recess in a locked position.

In one set of embodiments, the door lock detection system may include a motor-driven door lock bolt. The motor can move the bolt from a retracted position in which the bolt is at least partially retracted into or otherwise contained within the lock housing and/or door, to an extended position where at least a portion of the bolt is outside the lock housing and/or door. When the bolt is in the extended position and within the door jamb recess, the bolt is referred to herein as being engaged with the door jamb recess in the locked position. The door lock detection system may include a force applicator that applies a force to the door lock bolt as the bolt is driven by the motor into the door jamb recess. The force on the bolt is transmitted to the motor driving the bolt, causing the motor current to change in an attempt to overcome the applied force. The applied force may be constant or variable relative to the position of the bolt.

A current sensor may be used to sense the current of the motor as the bolt is driven into the door jamb recess. Increased current indicates increased motor load, which in turn indicates that greater force is being applied to the bolt against the movement direction of the bolt as the bolt is being moved from the retracted position to the extended position.

In one set of embodiments, the door lock detection system is able to determine whether the door lock bolt has engaged with a door jamb recess in a locked position by comparing the sensed motor current relative to bolt position against an expected motor current signature. The expected motor current signature is the expected profile of the motor current relative to bolt position when the door lock bolt is properly moved into the door jamb recess into the locked position. Evaluation circuitry may be used to compare the sensed motor current relative to bolt position to the expected current signature. The evaluation circuitry may determine that the bolt is engaged with the door jamb recess in a locked position when the sensed current of the motor relative to bolt position is within a threshold amount of the expected current signature. The signature may be stored within the system.

FIG. 1 depicts a schematic illustration of a door lock detection system 1 according to one set of embodiments that use a motor current signature to determine whether the door lock bolt has engaged with a door jamb recess in a locked position. A door 10 is shown on one side and a door jamb 20 is shown on the other. The door jamb 20 may include a recess 22 that receives a door lock bolt to achieve a locked door state. The system 1 may include two groups of components: components on the door side and components on the door jamb side.

The components on the door side may include a door lock 100 having a bolt 110. The bolt 110 may be driven by a motor 120 that is coupled to the bolt 110. Current drawn by the motor may be sensed by a current sensor 130. In some embodiments, the door lock 100 may have a housing that holds the motor 120 and current sensor 130, and the bolt 110 may be movable through the housing as it moves between a retracted position and an extended position. The lock 100 may be configured to attach to the door 10, with the bolt 110 positioned through a latch opening in the door. A latch plate 140 may be included on the door 10, the latch plate 140 having an opening through which the bolt moves. The components on the door jamb side may include a strike plate assembly 200 having a strike plate 210 and an opening 212 through which the bolt moves. In some embodiments, the strike plate assembly may simply be a strike plate 210 having an opening 212 through which the bolt moves. In some embodiments, the strike plate assembly may have components that are configured to be positioned within the door jamb recess 22. For example, as shown in FIG. 1, a strike plate assembly 200 may have a recessed surface 230 spaced from the opening 212. When installed, the recessed surface 230 may be positioned in the interior of the door jamb recess 22. In some embodiments, the strike plate assembly may have one or more passageway surfaces 220. Each passageway surface 220 may have a normal direction that is perpendicular to a normal direction of a plane containing the opening 212. In some cases, when installed, a passageway surface 220 may have a normal direction that is perpendicular to the movement direction of the door lock bolt. In some embodiments, the passageway surfaces 220 may contact the inner surfaces of the door jamb recess. In some embodiments, four passageway surfaces 220 are included in the strike plate assembly to form a fully surrounded channel. In other embodiments, one, two or three passageway surfaces 220 are included in the strike plate assembly. The passageway surfaces may be attached to one another. In some embodiments, if the strike plate assembly includes a recessed surface 230 and one or more passageway surfaces 220, the one or more passageway surfaces 220 may be attached to the recessed surface 230.

In some embodiments, the door lock detection system 1 may include a force applicator 300 that is configured to apply a force to the bolt 110 as the bolt is moved into the door jamb recess 22. The force applied to the bolt may be in a direction that opposes the movement direction of the bolt from a retracted position to an extended position, also referred to as the movement direction of the bolt into the door jamb recess. In some embodiments, the force applicator may be positioned inside the door jamb recess. In some embodiments, the force applicator is positioned on a recessed surface of the strike plate assembly and/or may be positioned on a passageway surface of the strike plate assembly. In some embodiments, the force applicator may be positioned on the bolt itself.

In some embodiments, the force applicator includes a spring. In one illustrative example shown in FIG. 1, the force applicator 300 includes a spring 310 positioned inside the recess 22 of the door jamb 20. The force applicator 300 is attached to the recessed surface 230 of the strike plate assembly 200. The force applicator 300 may further include a plate 312 attached to the spring 310, where the plate serves as a contact surface against the bolt 110 as the bolt is moved into the recess. As the bolt 110 moves from a retracted position into an extended position into the door jamb recess 22, the bolt 110 may contact the plate 312 and compress the spring 310. Compression of the spring produces a reaction spring force onto the bolt. Without wishing to be bound by theory, in some embodiments, the reaction spring force may be proportional to the spring compression distance and the spring constant, K, of the spring 310, as per Hooke's Law. As a result, the force applied to the bolt from the force applicator 300 may increase as the spring is increasingly compressed.

Figure 2:
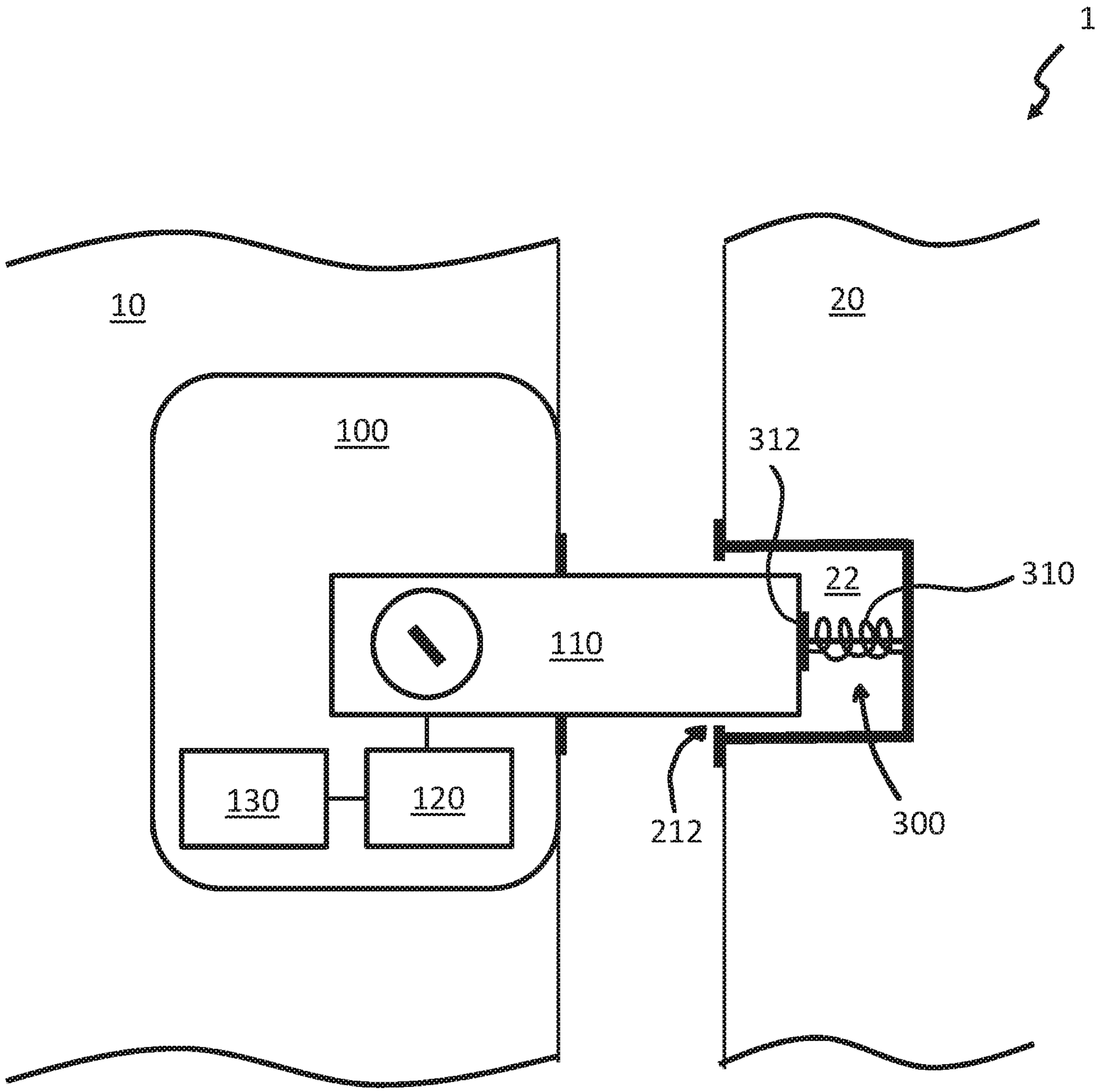
FIG. 2 depicts the door lock detection system of FIG. 1 with the door lock bolt advanced to an intermediate position in which the bolt has entered a door jamb recess and contacted a force applicator.
Figure 3:
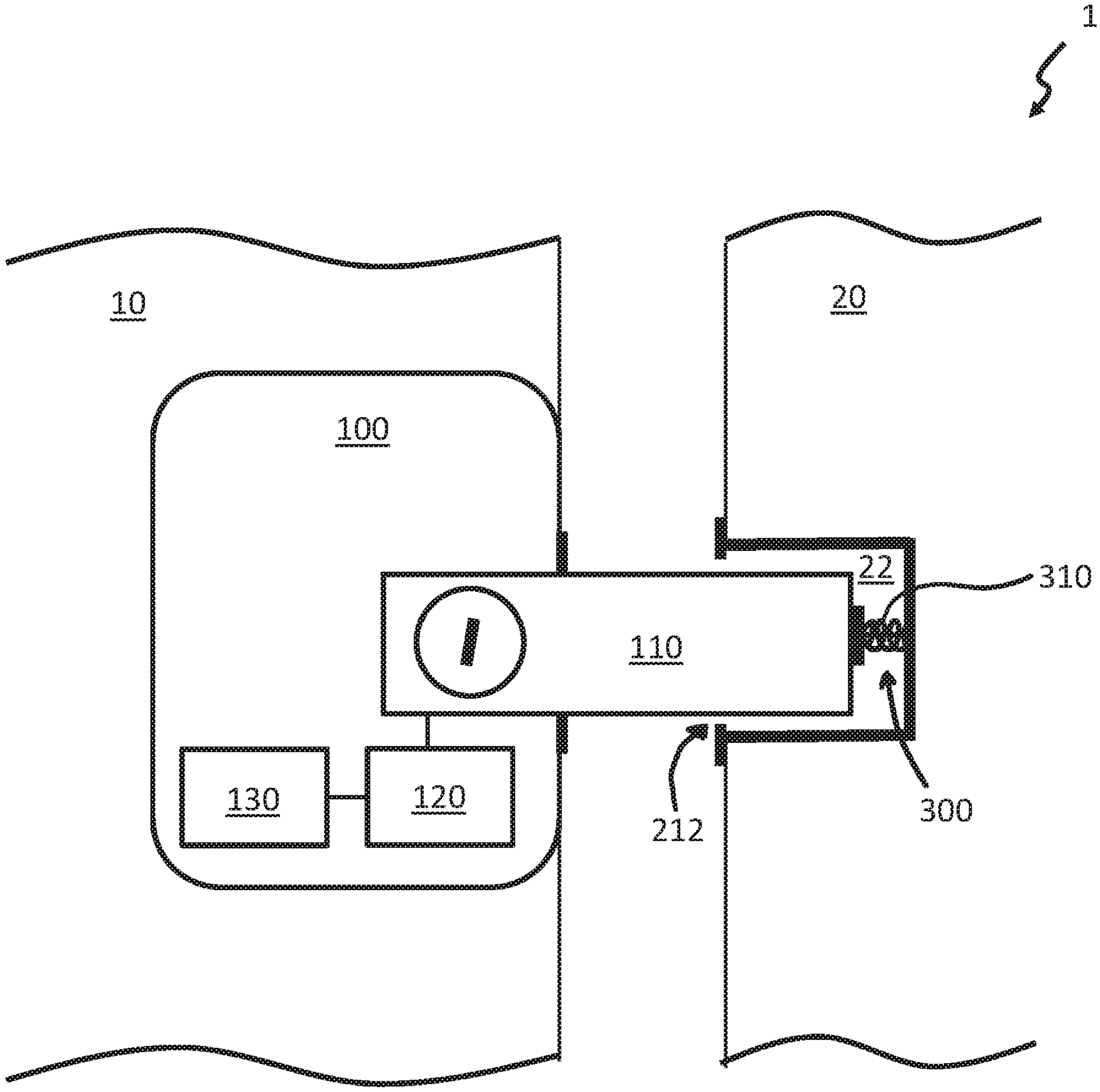
FIG. 3 depicts the door lock detection system of FIG. 1 with the door lock bolt advanced to a fully extended position in which the bolt has fully entered the door jamb recess against force applied by the force applicator.

In FIG. 1, the bolt 110 has not yet entered the door jamb recess 22 or made contact with the force applicator 300. As such, there is no force imparted to the bolt 110 by the force applicator 300 at this stage. In FIG. 2, the bolt 110 has moved into an intermediate position such that it has entered the door jamb recess 22 and made initial contact with the force applicator 300. The spring 310 has not yet been compressed, and thus no force is imparted to the bolt 110 by the force applicator 300. However, as the bolt 110 moves further into the recess 22, the force applicator 300 will begin to exert a force against the bolt 110 in a direction that opposes the movement direction of the bolt from a retracted position to an extended position. In FIG. 3, the bolt 110 has moved far enough toward the extended position to compress the spring 310 of the force applicator. At this stage, the force applicator is exerting a force against the bolt 110, increasing the load on the motor 120, which in turn increases the motor current, which is sensed by the current sensor 130.

Figure 4:
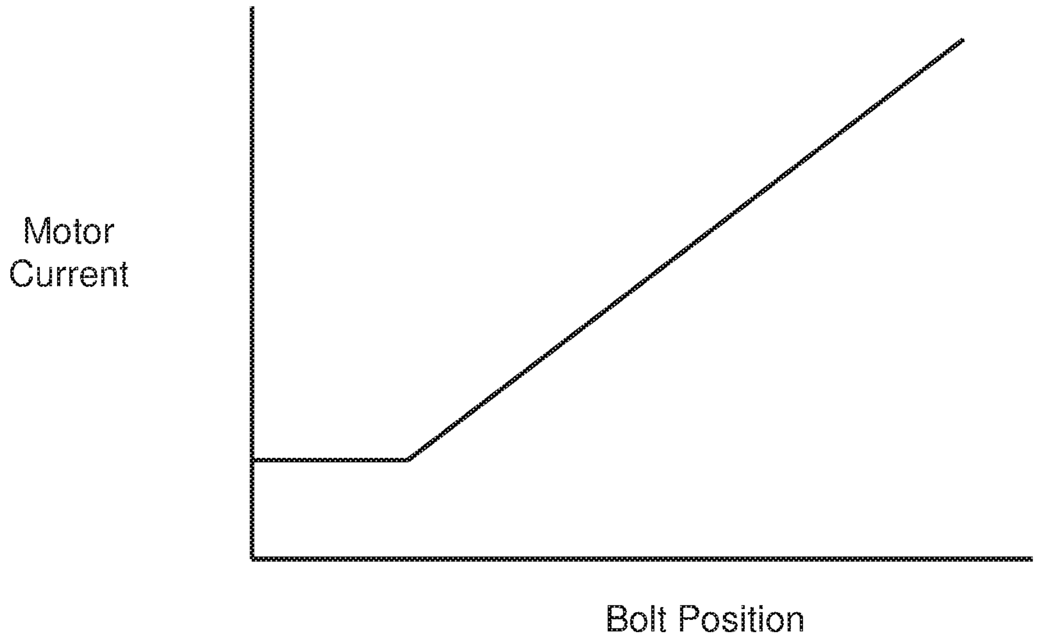
FIG. 4 is a schematic representation of a graph of a sensed profile of motor current relative to bolt position for the door lock detection system embodiment of FIG. 1.

An illustrative example of a graph of sensed motor current relative to bolt position is shown in FIG. 4. The motor current begins at a low, constant value, and then begins to increase steadily as the bolt moves toward an extended position when the bolt engages or otherwise interacts with the force applicator. Such a graph could be associated with the spring force applicator embodiment of FIG. 1, in which the force imparted to the bolt is variable and linearly increasing.

Figure 5:
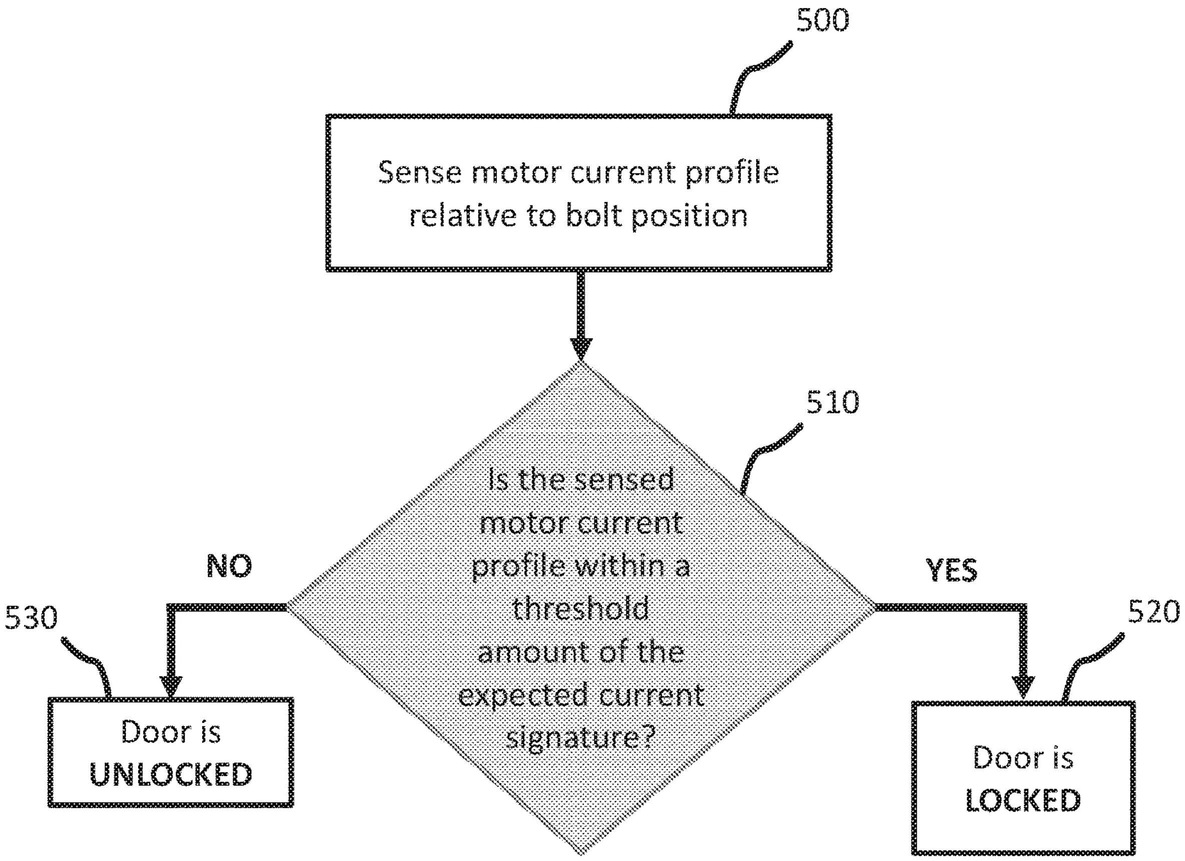
FIG. 5 is a schematic representation of a door lock determination method according to some aspects.

In some embodiments, the sensed motor current may be compared to an expected motor current signature. As discussed above, the expected motor current signature is the expected profile of the motor current relative to bolt position when the door lock bolt is properly moved into the door jamb recess into the locked position. In some embodiments, the system compares the sensed motor current to an expected motor current signature to determine whether the door is locked. A flow chart illustrating an exemplary process is shown in FIG. 5. At block 500, the system may sense motor current relative to the position of the bolt. In some embodiments, the system senses a current profile, e.g., the relationship between the motor current and the position of the bolt as the bolt moves from a retracted position to an extended portion. The profile may cover the entire spectrum of positions of the bolt, or only a portion of the spectrum of bolt positions. At block 510, the system may compare the sensed motor current profile to the expected current signature. If the sensed motor current profile is within a threshold amount of the expected current signature, the process proceeds to block 520 in which the system may determine that the door is locked. Otherwise, the process proceeds to block 530 in which the system may determine that the door is unlocked.

Figure 6A:
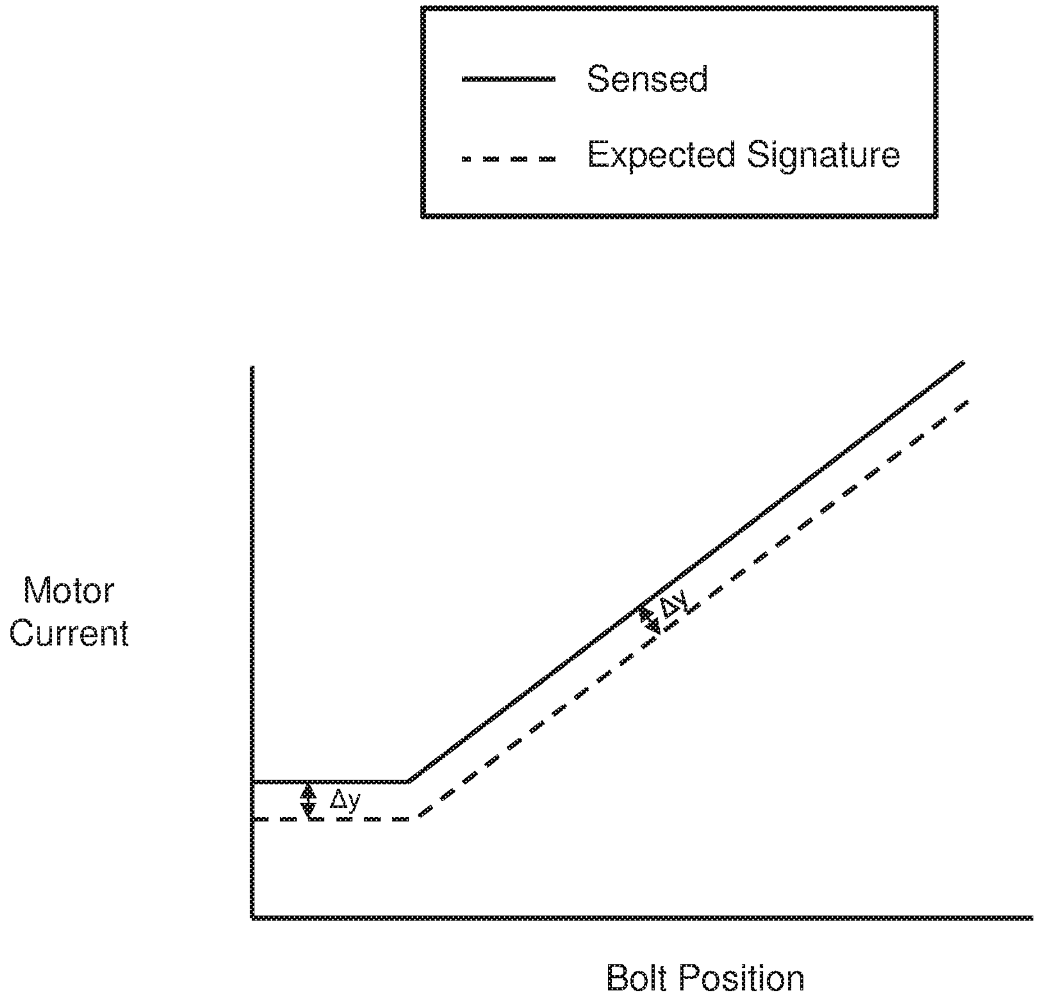
FIG. 6A is a schematic representation of a comparison between a sensed current profile to an expected current profile for a door in a locked state.

An illustrative example of a graph comparing sensed motor current relative to bolt position to an expected current signature when a door is in the locked state is shown in FIG. 6A. In some embodiments, even when the door is in the properly locked state, the sensed current may vary slightly from the expected signature. In the illustrative example of FIG. 6A, the sensed current differs from the expected signature by an amount Δy. In some embodiments, the system may determine that the bolt is engaged with the door jamb recess in a locked position when the sensed current of the motor relative to bolt position is within a threshold amount of the expected current signature. For example, in the FIG. 6A embodiment, if Δy is within the threshold amount, then the system determines that the bolt is engaged with the door jamb recess in a locked position.

Figure 6B:
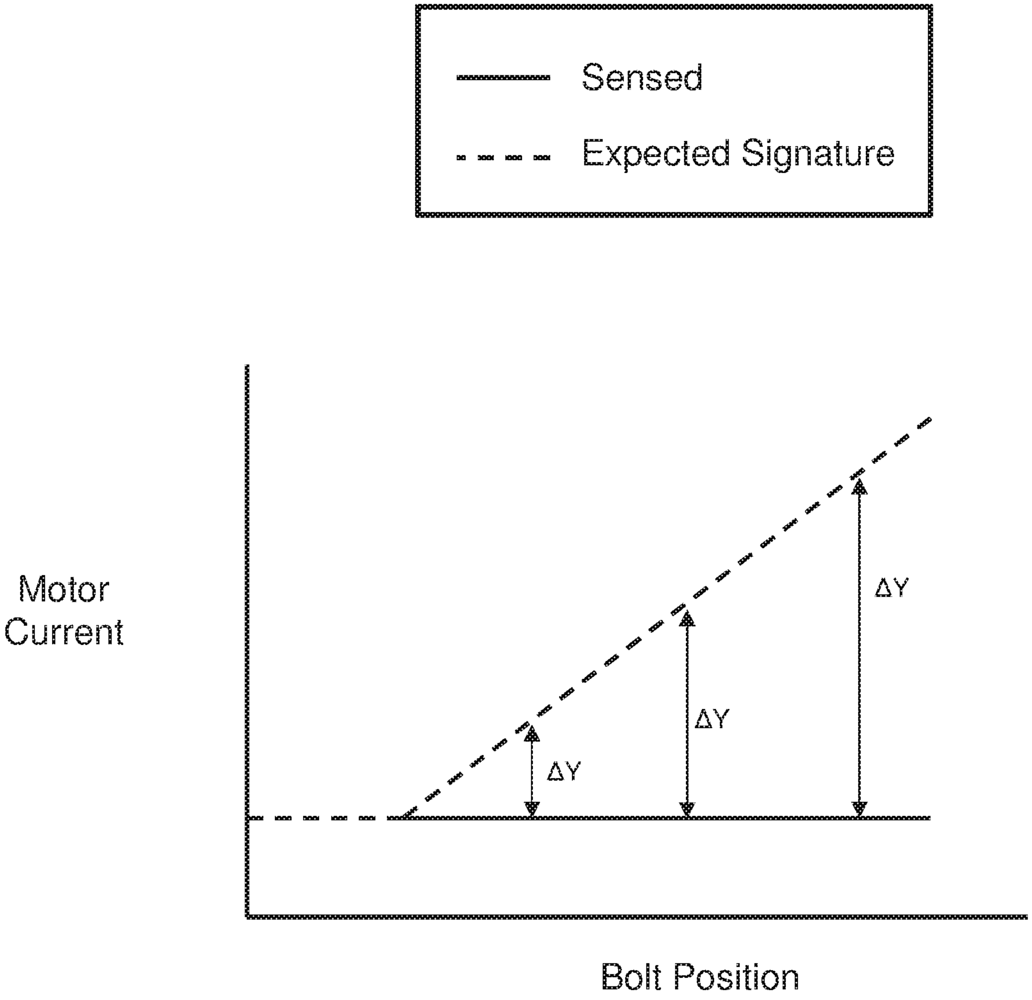
FIG. 6B is a schematic representation of a comparison between a sensed current profile to an expected current profile for a door in an unlocked state.

An illustrative example of another graph comparing sensed motor current relative to bolt position to an expected current signature when a door is in an unlocked state is shown in FIG. 6B. In this example, the bolt has been moved to the extended position, but the sensed current has remained constant relative to the position of the bolt. Here, the sensed current differs from the expected signature by an amount ΔY. The amount ΔY increases as the bolt moves toward the extended position. The system may detect that the amount ΔY is outside of the threshold amount (e.g., on average, at a particular section of the spectrum, or other suitable calculation method). As a result, the system may determine that door is unlocked.

It should be appreciated that the force applicator 300 may be located at a different position than that shown in the FIG. 1 embodiment. For example, in some embodiments, the force applicator may be located on the bolt itself. As the bolt enters the door jamb recess, the force applicator contacts either an inner end surface of the door jamb recess itself, or a recessed surface of a strike plate assembly, and a spring force in a direction against the movement direction of the bolt into the door jamb recess is imparted to the bolt, with an increasing amount of force as the bolt moves further into the recess.

In some embodiments, the force applicator includes a detent. In one illustrative example shown in FIG. 7, the force applicator 300 includes a pawl 330 and spring 320 positioned inside the recess 22 of the door jamb 20. The pawl 330 may interact with the bolt 110 as the bolt enters the recess 22, exerting a force on the bolt 110 as the bolt moves into the door jamb recess 22. In some embodiments, the pawl may interact with a series of protrusions 112 and indentations 113 that may be either part of the bolt 110 itself or be otherwise attached to the bolt. As the bolt 110 moves into the door jamb recess 22, the distal-most protrusion 112 on the bolt approaches and contacts the pawl 330, pushing the pawl and causing it to rotate (in FIG. 7, the pawl is pushed to rotate in the counterclockwise direction). As the pawl rotates, the spring 320 is elongated, and thus the pawl exerts a force onto the bolt 110 as the bolt moves in the extension direction. After the pawl 330 clears the first protrusion, it enters the first, distal-most indentation 113 that follows the first protrusion. Because the pawl is spring-biased to move back to its original, non-stressed position, the pawl may rotate back slightly (in a clockwise direction in FIG. 7) until it contacts the subsequent protrusion as shown in FIG. 8, and the cycle restarts. When the pawl clears the first protrusion and enters the subsequent indentation, the force on the bolt may decrease until the pawl makes contact with the next protrusion and the cycle restarts. Accordingly, the motor current load associated with the embodiment of FIG. 7 may be variable relative to the bolt position, and may cyclically increase and decrease as the bolt is driven into the recess. Such a variable signature may provide an additional measure of reliability, e.g., by reducing the likelihood of a false positive.

Figure 7:
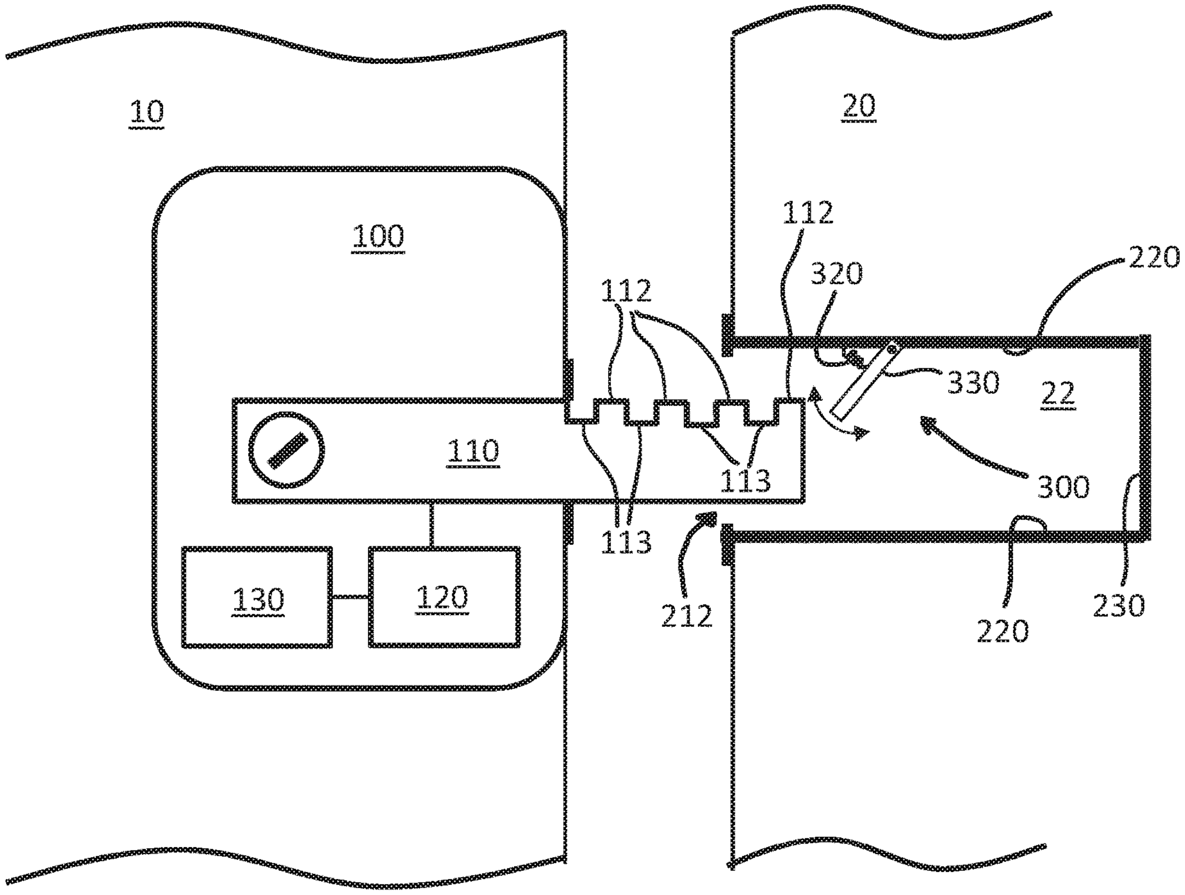
FIG. 7 depicts another embodiment of a door lock detection system according to some aspects.
Figure 8:
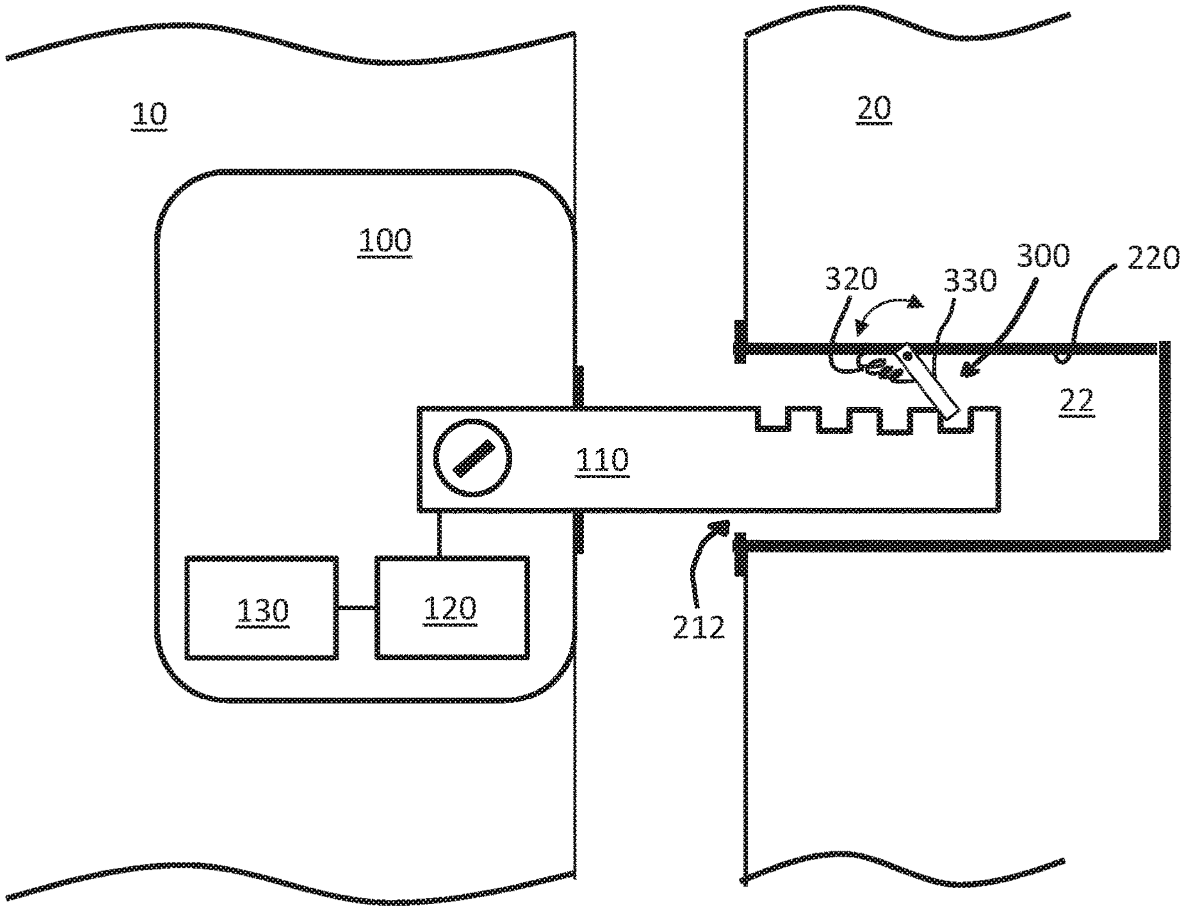
FIG. 8 depicts the door lock detection system of FIG. 7 with the door lock bolt advanced to an intermediate position in which the bolt has moved further into the door jamb recess against force applied by a force applicator.
Figure 9A:
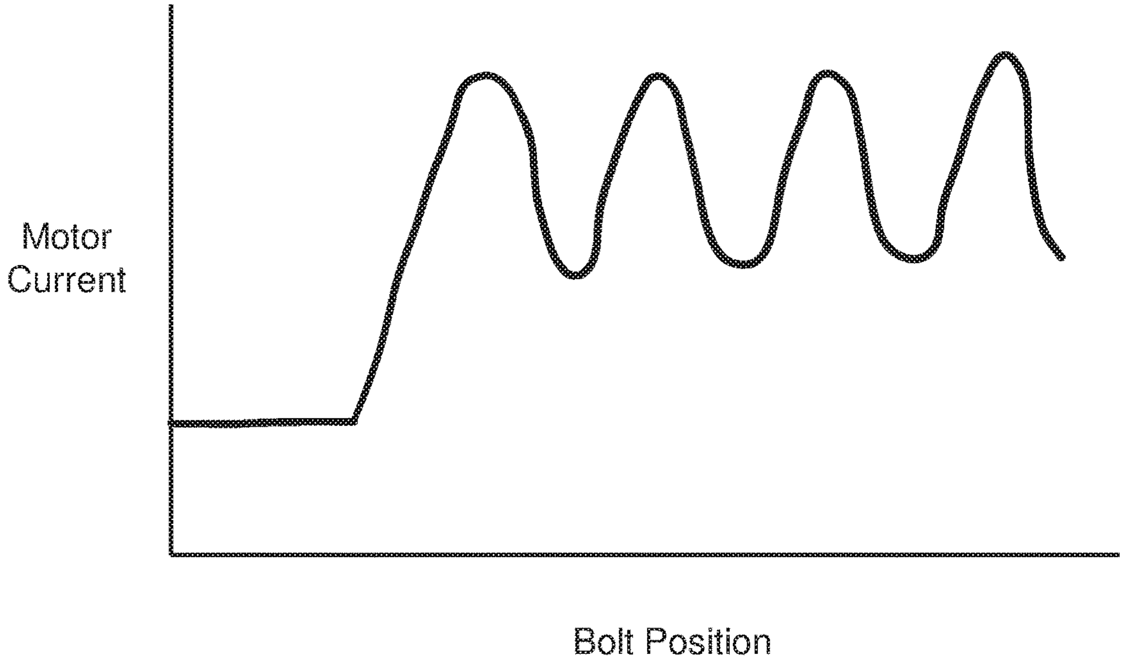
FIG. 9A is a graph of sensed motor current relative to bolt position for the door lock detection system embodiment of FIG. 7.

An illustrative example of a possible graph of sensed motor current relative to bolt position that could be associated with the embodiment of FIG. 7 is shown in FIG. 9A. The motor current begins at a low, constant value, and then increases-which could reflect contact between the pawl and the first distal-most protrusion. The motor current then proceeds to decrease, which could reflect the entry of the pawl into an indentation, and then increase again, which could reflect contact of the pawl with a subsequent protrusion.

Figure 9B:
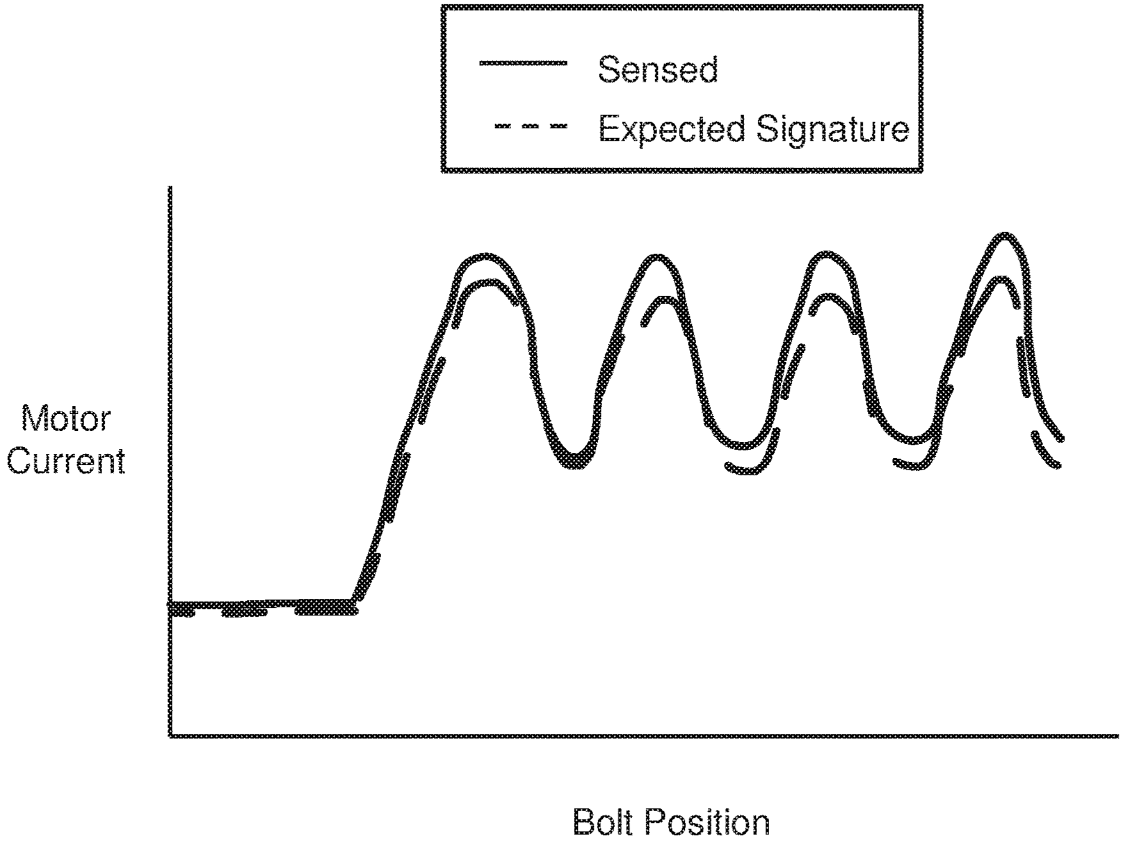
FIG. 9B is the graph of FIG. 9A with an expected current signature superimposed on the graph for comparison with the sensed current profile.

The system may compare the sensed current profile to an expected current signature, as represented schematically by the graph in FIG. 9B where the expected signature is superimposed on the graph of the sensed current. In some embodiments, even with slight differences between the sensed current and the expected current signature, the sensed current may still be considered to be within a threshold amount of the expected current signature, and as a result the system may detect that the door is in the locked state.

The FIG. 7 embodiment and associated FIG. 9A graph illustrate an embodiment in which the force applicator can apply a variable force on the bolt, where the force increases and decreases as the bolt moves through the door jamb recess.

In some embodiments, the detent (pawl 330 and spring 320) of the force applicator 300 may be attached to a passageway surface 220 of the strike plate assembly. Although the pawl 330 is shown attached to an upper passageway surface 220 in FIG. 7, it should be understood that the pawl 330 may be attached to a lower passageway surface, or a side passageway surface (not visible in the view shown in FIG. 7; the strike plate assembly may have one or two side passageway surfaces are located in planes that are parallel to the plane of the page in FIG. 7 one being behind the plane of the page and the other being in front of the plane of the page.).

It should be appreciated that different configurations of the protrusions and indentations on/attached to the bolt are possible. In some embodiments, the height and/or width of each of the protrusions may be different from one another. Alternatively or in addition, in some embodiments, the depth and/or width of each of the indentations may be different from one another. Any combination of sizes of protrusions and indentations may be used. The combination of protrusion/indentation size and position may change the expected motor current signature for the lock detection system. As noted, a variable signature can provide an additional level of reliably ascertaining whether the bolt is actually engaged in the recess.

Figure 10:
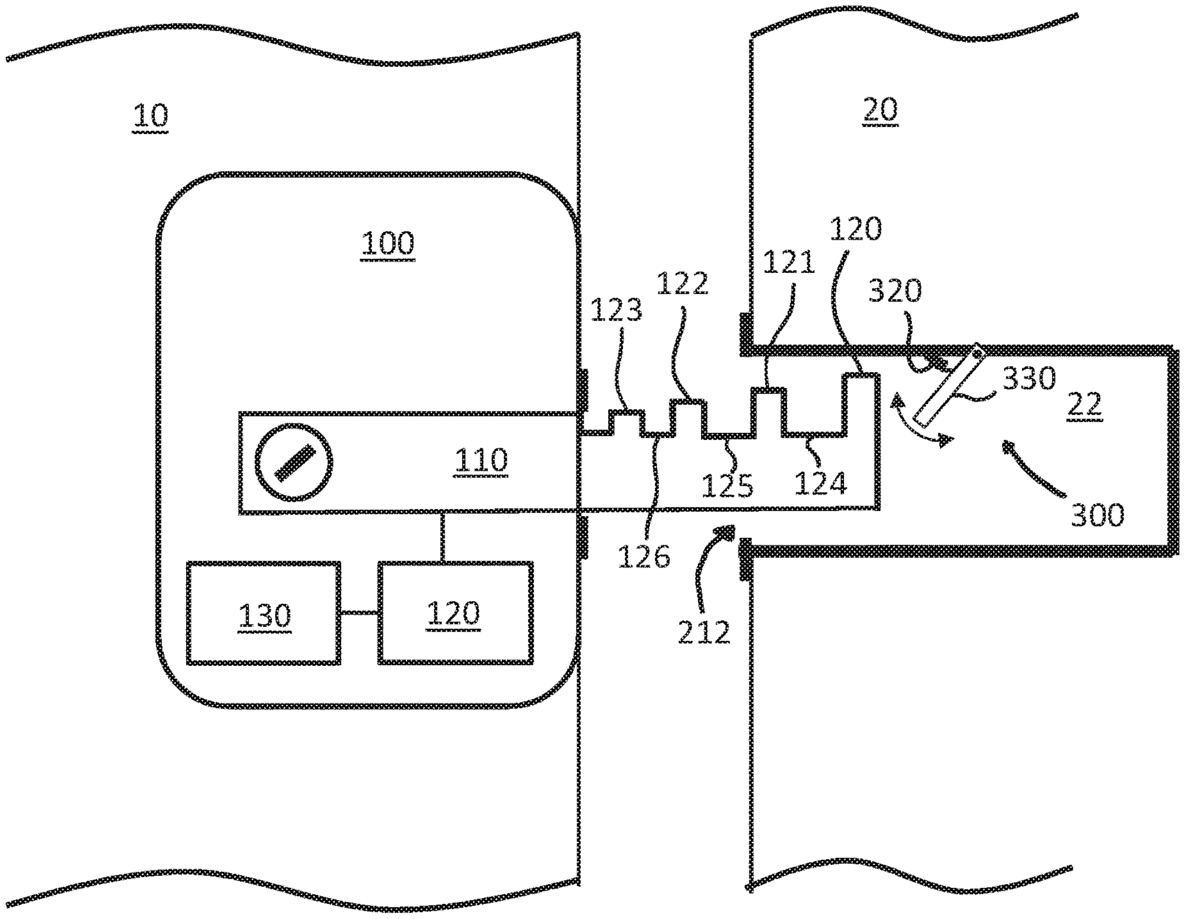
FIG. 10 depicts another embodiment of a door lock detection system according to some aspects.
Figure 11A:
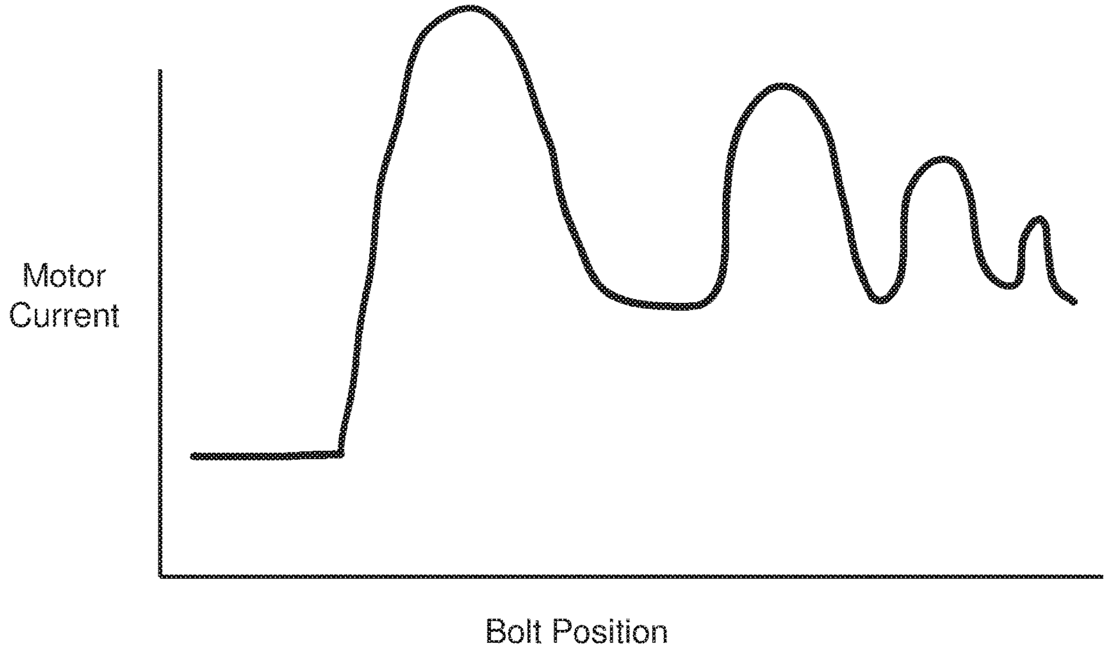
FIG. 11A is a graph of sensed motor current relative to bolt position for the door lock detection system embodiment of FIG. 10.
Figure 11B:
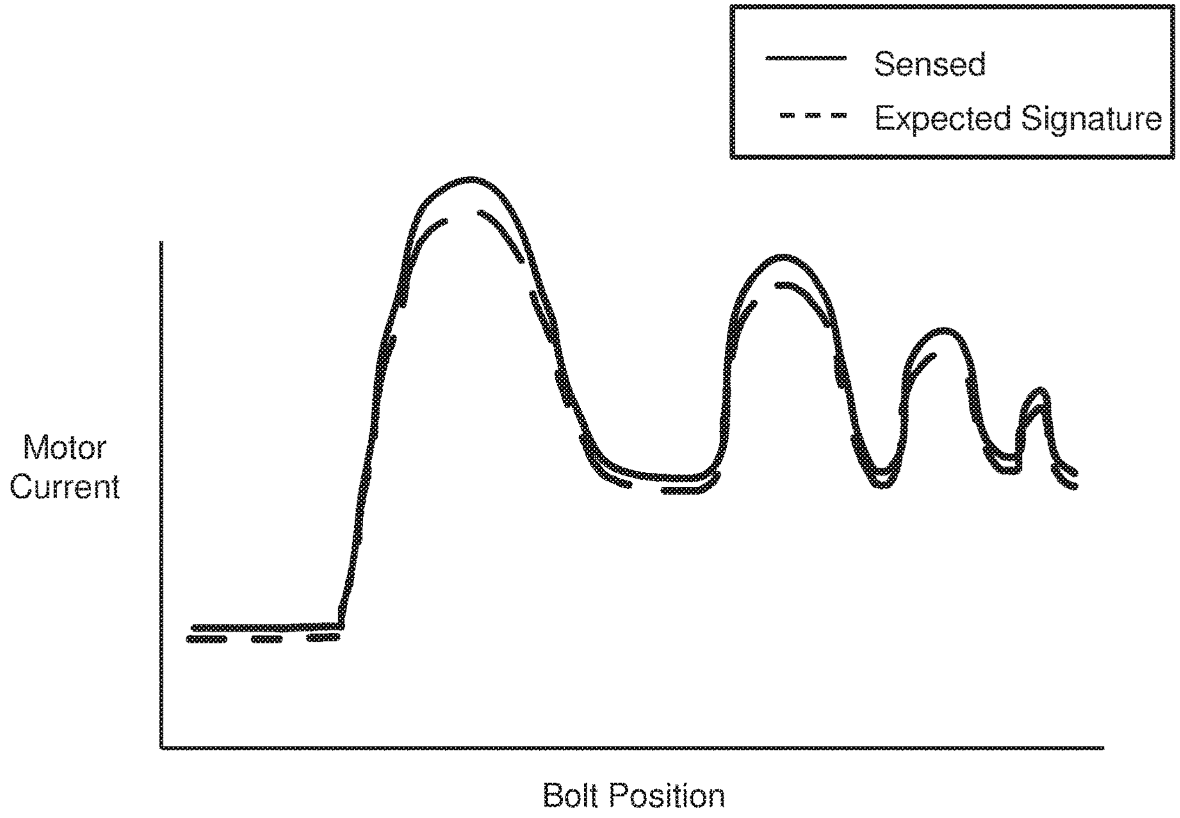
FIG. 11B is the graph of FIG. 11A with an expected current signature superimposed on the graph for comparison with the sensed current profile.

As an illustrative example, FIG. 10 depicts an embodiment in which the protrusions 120, 121, 122 and 123 each have successively shorter heights. In addition, the indentations 124, 125 and 126 each have successively shorter widths. A schematic representation of a possible associated motor current over bolt position is shown in the graph of FIG. 11A. The system may compare the sensed current profile to an expected current signature, as represented schematically by the graph in FIG. 11B where the expected signature is superimposed on the graph of the sensed current. In some embodiments, even with slight differences between the sensed current and the expected current signature, the sensed current may still be considered to be within a threshold amount of the expected current signature, and as a result the system may detect that the door is in the locked state.

It should be appreciated that other configurations of the detent may be used. For example, instead of a pawl, the detent may be a rotatable wheel (can be a circle, semi-circle or other incompletely circular shape) having teeth that correspond with the protrusions and indentations of or attached to the bolt. In some embodiments, the toothed wheel may be spring-biased or otherwise biased to impart a force on the bolt.

It should also be appreciated that other types of force applicators may be used other than those using a spring. For example, in some embodiments, frictional pads may be used to impart a force on the bolt. One or more frictional pads may be located on upper, lower, and/or side passageway surfaces within the door jamb recess. As the bolt enters the door jamb, the surface of the bolt may slide against the one or more frictional pads. To create a more varied motor current signature, a plurality of pads may be located throughout the length of the recess, such that the force applied to the bolt increases at set distances as the bolt moves into the recess. Pads may be spaced from one another or directly adjacent to one another. In some embodiments, some or all of the pads may have different coefficients of friction than one another.

Other types of force applicators include pneumatics, an eccentric (i.e., a body having a rotating axle with an offset center) that is configured and positioned to be rotated by the bolt as the bolt moves into the door jamb recess, potential energy storage components such as a rubber band or rubber band-like component that is stretched as the bolt moves into the door jamb recess, a compressible, elastic wedge that is positioned attached to a passageway surface, where the height of the wedge increases in the direction of movement of the bolt into the door jamb recess, or a flexible elastic member that interacts with surface features on or attached to a bolt like the pawl of FIG. 7, or a block or other shape of material that substitutes for the spring of FIG. 1 and stores energy as it is compressed, or any other force applicator suitable for imparting a force to the bolt in a direction that opposes the movement direction of the bolt from the retracted position to an extended position into the door jamb recess.

Figure 12:
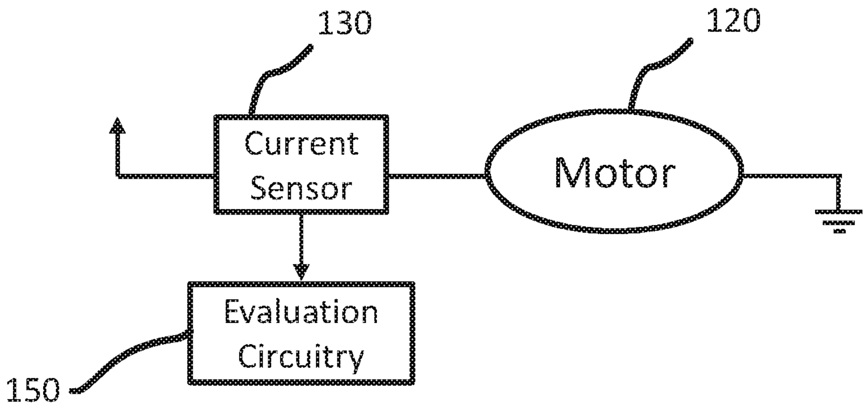
FIG. 12 is a schematic circuit diagram for a door lock detection system using a current sensor.

An illustrative circuit diagram for the motor current sensing and comparison operations is shown in FIG. 12. The motor 120 is connected in series to a current sensor 130 configured to sense the amount of current being drawn by the motor as the bolt changes position. The sensed current from the current sensor 130 is output to evaluation circuitry 150 configured to compare the sensed motor current to a stored expected current signature. The current sensor 130 may be any device suitable to measure current, such as an ammeter.

In some embodiments, the evaluation circuitry 150 comprises a processor running software that compares the sensed motor current to the stored expected current signature. As a non-limiting, illustrative embodiment, the software may use Fourier transforms to calculate the differences between the sensed current and the expected current.

In some embodiments, the evaluation circuitry 150 may comprise a hardware arrangement rather than using software. For example, the evaluation circuitry may comprise a comparator circuit.

In some cases, even if the door lock bolt has been properly advanced into and engaged with the door jamb recess in the locked position, the motor current signal may not match perfectly with the expected current signature. Slight mismatches may arise due to noise, artifacts in the motor, current sensor, and the evaluation circuitry, or due to other sources of distortion, even if filters are utilized. In some embodiments, the evaluation circuitry 150 may be configured to determine that the bolt is engaged with the door jamb recess in a locked position when the sensed current of the motor relative to bolt position is within a threshold amount of the expected current signature. The threshold amount may be in the form of percentage, an absolute value, or a combination of both.

The system may use various calculations to determine whether or not a sensed current is within a threshold amount. For example, in situations where the difference between the sensed current and the expected signature varies along different bolt positions, the system may calculate the difference at each bolt position and take an average. In some embodiments, the threshold may vary along the bolt position. In other words, the tolerance for differences may be greater at certain bolt positions as compared to others. For example, in one embodiment, the threshold is smaller when the bolt is closer to the retracted and extended positions and greater in the positions in-between, or vice versa. In some embodiments, the system only compares a portion of the sensed and expected profiles, rather than the total profiles along the entire bolt position spectrum.

In some embodiments, the expected motor current signature may be stored in the lock detection system at the manufacturing stage. In some embodiments, a user may have the ability to calibrate the expected motor current signature to update the expected signature as parts change over time, due to, e.g., wear and tear.

Vibration Signature

According to another aspect, a door lock detection system may use a vibration signature to determine whether the door lock bolt has engaged with a door jamb recess in a locked position.

In one set of embodiments, the door lock detection system may include a vibration applicator that applies a known amount of vibration to the door lock bolt as the bolt is moved into the door jamb recess. A vibration sensor may be used to sense the vibration of the bolt as the bolt is moved into the door jamb recess.

The system may have a stored expected vibration signature, which is the expected profile of the bolt vibration relative to bolt position when the door lock bolt is properly moved into the door jamb recess into the locked position.

Evaluation circuitry may be used to compare the sensed vibration relative to bolt position to the expected vibration signature. The evaluation circuitry may determine that the bolt is engaged with the door jamb recess in a locked position when the sensed bolt vibration relative to bolt position is within a threshold amount of the expected vibration signature.

Figure 13:
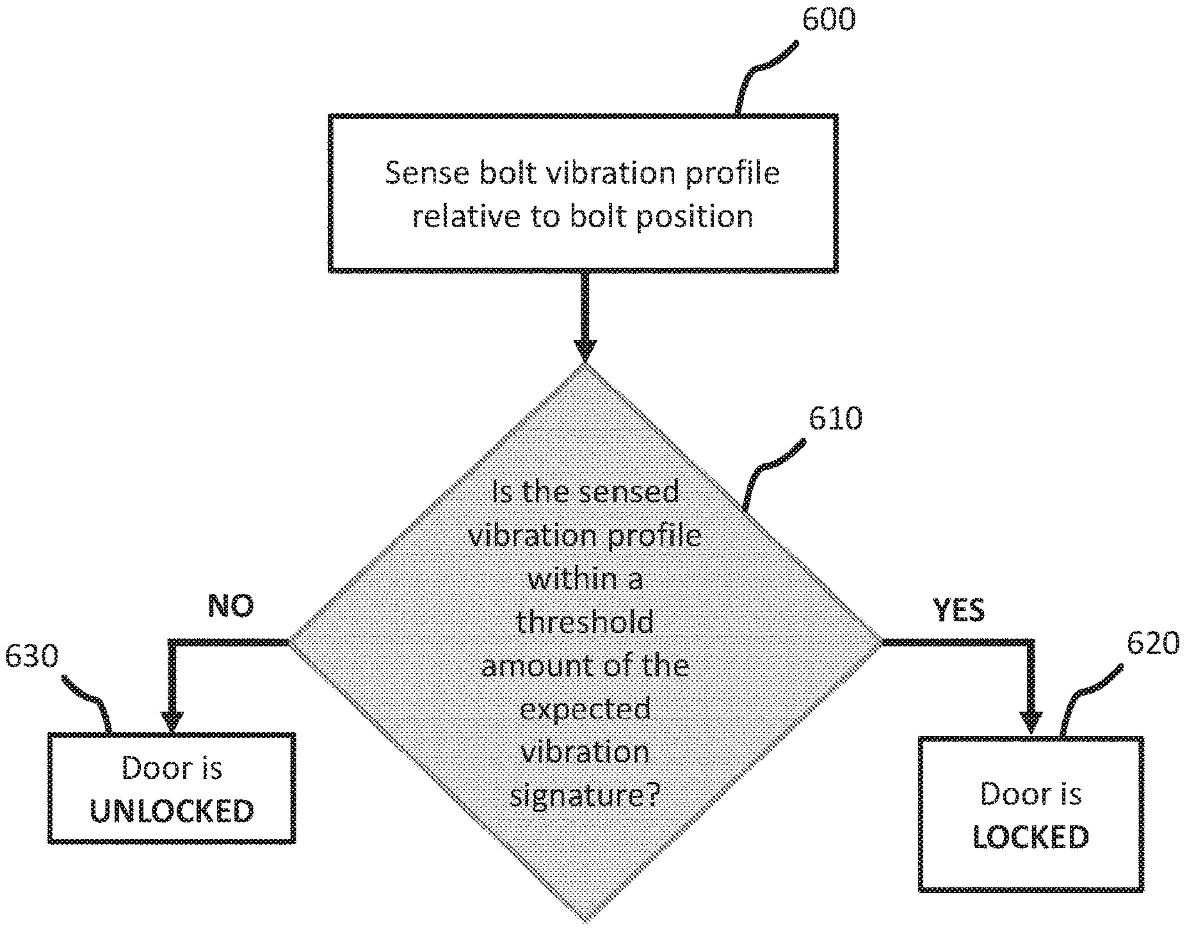
FIG. 13 is a schematic representation of a door lock determination method according to some aspects.

A flow chart illustrating such a process is shown in FIG. 13. At block 600, the system may sense bolt vibration relative to the position of the bolt. In some embodiments, the system senses a vibration profile, e.g., the relationship between the bolt vibration and the position of the bolt as the bolt moves from a retracted position to an extended portion. The profile may cover the entire spectrum of positions of the bolt, or only a portion of the spectrum of bolt positions. At block 610, the system may compare the sensed vibration profile to the expected vibration signature. If the sensed vibration profile is within a threshold amount of the expected vibration signature, the process proceeds to block 620 in which the system may determine that the door is locked. Otherwise, the process to block 630 in which the system may determine that the door is unlocked.

Figure 14:
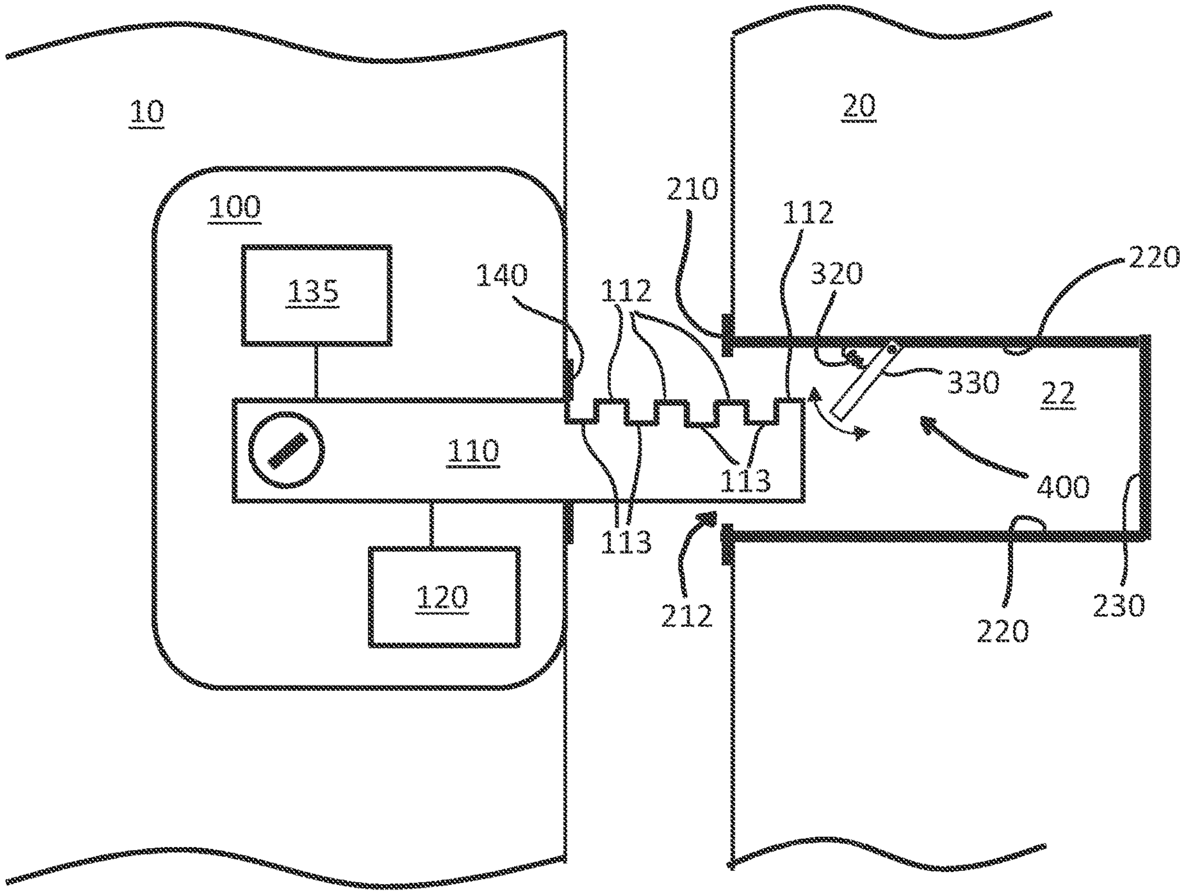
FIG. 14 depicts another embodiment of a door lock detection system according to some aspects.

FIG. 14 depicts a schematic illustration of a door lock detection system 1 according to one set of embodiments that use a vibration signature to determine whether the door lock bolt has engaged with a door jamb recess in a locked position. The door lock detection system 1 may have a detent arrangement similar to that of the embodiment of FIG. 7. Common features between the embodiment of FIG. 14 and the embodiment of FIG. 7 are labeled in FIG. 14 and operate similarly to what has been described in the FIG. 7 embodiment. A motor 120 may be used to drive the bolt 110. In some embodiments, a pawl 330 and spring 320 may serve as a vibration applicator 400 that applies a vibration to the bolt 110 as the bolt moves into the door jamb recess 22.

In the embodiment of FIG. 14, the door lock detection system senses vibrations of the bolt as the bolt moves from a retracted to an extended position into the recess of the door jamb. The system uses a vibration sensor 135 to sense the vibration of the bolt. In some embodiments, the vibration sensor is an accelerometer, and may be coupled to the bolt 110 to sense vibration of the bolt. It should be appreciated that the vibration sensor may alternatively comprise velocity sensors, piezoelectric sensors, proximity probes, laser displacement sensors, or any other suitable device for sensing vibration.

As the bolt 110 moves into the door jamb recess 22, the distal-most protrusion 112 on the bolt approaches and contacts the pawl 330, pushing the pawl and causing it to rotate (in FIG. 14, the pawl is pushed to rotate in the counter-clockwise direction). This initial contact between the bolt and the pawl may impart vibrations to the bolt that are sensed by the vibration sensor.

As the pawl rotates, the spring 320 is elongated. After the pawl 330 clears the first protrusion, it may briefly enter the first, distal-most indentation that follows the first protrusion, but may quickly thereafter strike against the subsequent protrusion both because of the continued movement of the bolt and because the pawl is spring-biased to move (clockwise in FIG. 14) back to its original, non-stressed position. This striking of the second protrusion by the pawl may impart vibrations to the bolt that are sensed by the vibration sensor. This cycle of pushing the pawl back counter-clockwise and the pawl clearing a protrusion and striking the next protrusion may continue as the bolt continues to move further into the door jamb recess. Accordingly, the vibration of the bolt associated with the embodiment of FIG. 14 may cycle through periods of high vibration and low vibration.

Figure 15A:
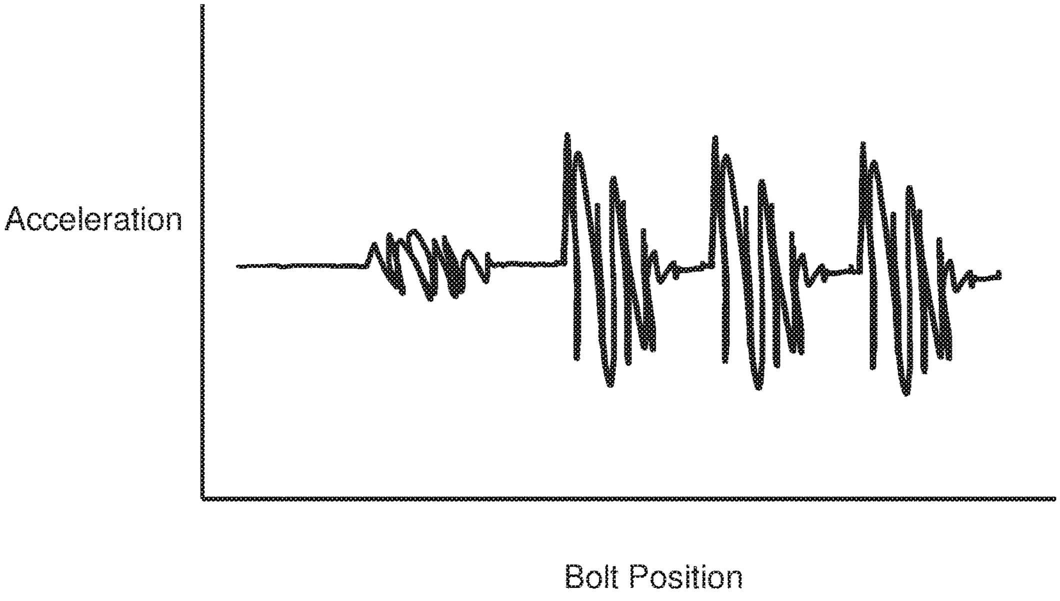
FIG. 15A is a graph of sensed door lock bolt vibration relative to bolt position for the door lock detection system embodiment of FIG. 14.

An illustrative example of a possible graph of sensed vibration of the bolt relative to bolt position that could be associated with the embodiment of FIG. 14 is shown in FIG. 15A. Vibration of the bolt, as, in this case, measured by acceleration, begins at a low value, and then undergoes a first slightly larger group of vibrations. This first group of vibrations could be associated with the initial contact between the pawl and the first protrusion. The bolt then undergoes a series of larger vibrations, where each group of vibrations are spaced from one another. Each of these groups of vibrations could be associated with an event of the pawl striking the subsequent protrusions.

Figure 15B:
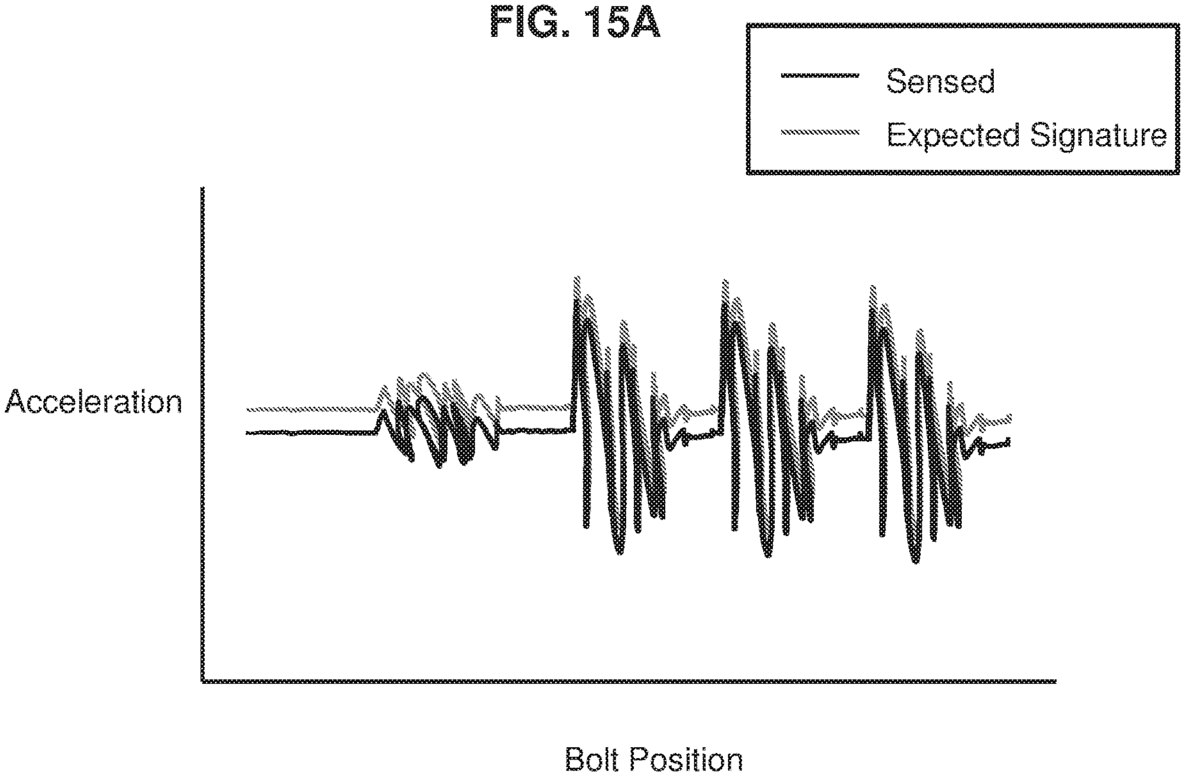
FIG. 15B is the graph of FIG. 15A with an expected vibration signature superimposed on the graph for comparison with the sensed vibration profile.

The system may compare the sensed vibration profile to an expected vibration signature, as represented schematically by the graph in FIG. 15B where the expected signature is superimposed on the graph of the sensed vibration. In some embodiments, even with slight differences between the sensed vibration and the expected vibration signature, the sensed vibration may still be considered to be within a threshold amount of the expected vibration signature, and as a result the system may detect that the door is in the locked state.

Figure 16:
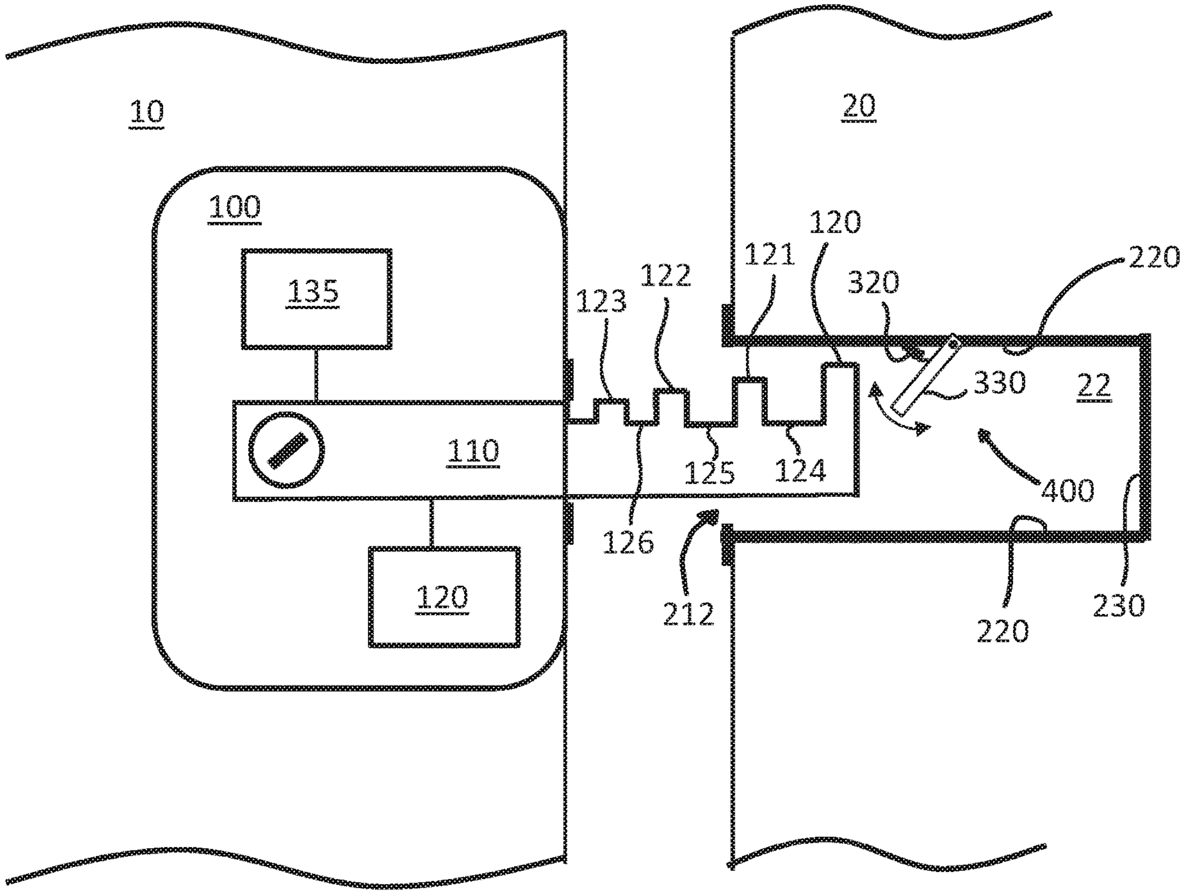
FIG. 16 depicts another embodiment of a door lock detection system according to some aspects.
Figure 17A:
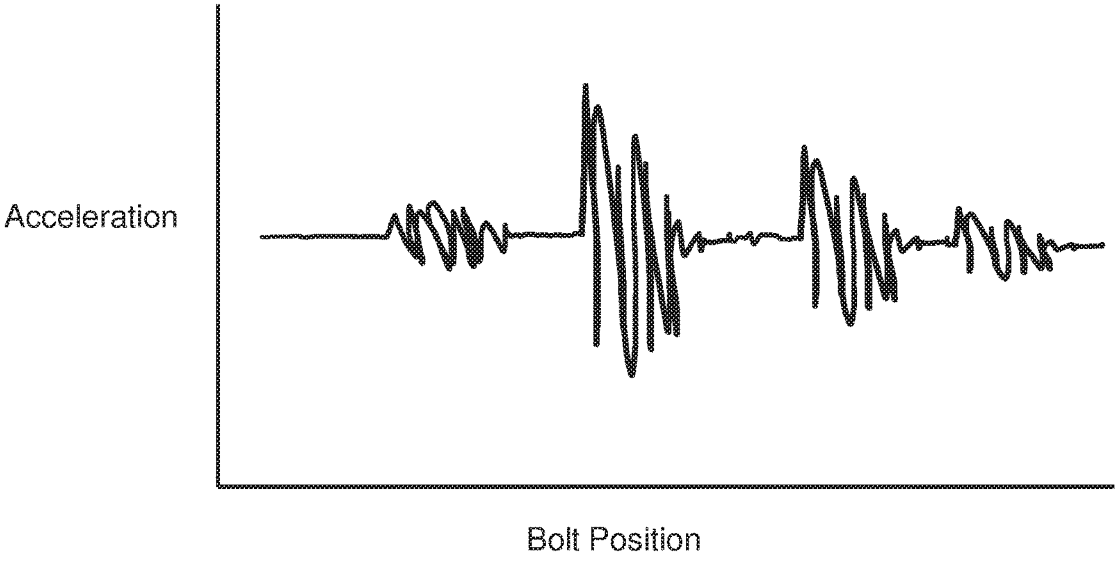
FIG. 17A is a graph of sensed door lock bolt vibration relative to bolt position for the door lock detection system embodiment of FIG. 16.

The expected vibration signature of a door lock detection system may be varied based on the shape and/or position of the protrusions and indentations on or attached to the bolt. For example, FIG. 16 depicts an embodiment in which the protrusions 120, 121, 122 and 123 each have successively shorter heights. In addition, the indentations 124, 125 and 126 each have successively shorter widths. A schematic representation of a possible associated vibration profile of the bolt relative to bolt position is shown in the graph of FIG. 17A. In the graph of FIG. 17A, the first group of vibrations has the largest amplitude, followed by a second group of vibrations having a smaller amplitude, and so on. In addition, the spacing between the first group of vibrations and the second group of vibrations is greater than the spacing between the second group of vibrations and the third group, and so on.

Figure 17B:
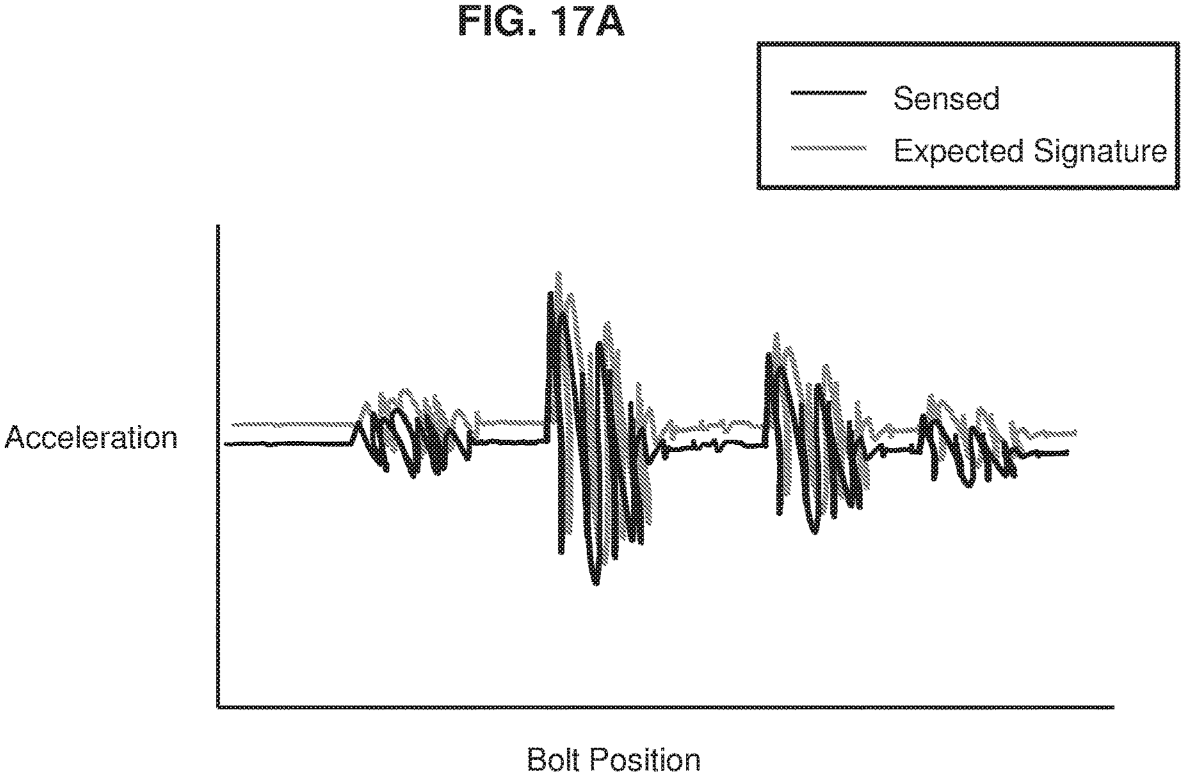
FIG. 17B is the graph of FIG. 17A with an expected vibration signature superimposed on the graph for comparison with the sensed vibration profile.

The system may compare the sensed vibration profile to an expected vibration signature, as represented schematically by the graph in FIG. 17B where the expected signature is superimposed on the graph of the sensed vibration. In some embodiments, even with slight differences between the sensed vibration and the expected vibration signature, the sensed vibration may still be considered to be within a threshold amount of the expected vibration signature, and as a result the system may detect that the door is in the locked state. A varying vibration signature may provide a more robust detection system by reducing or eliminating false positives.

Figure 18:
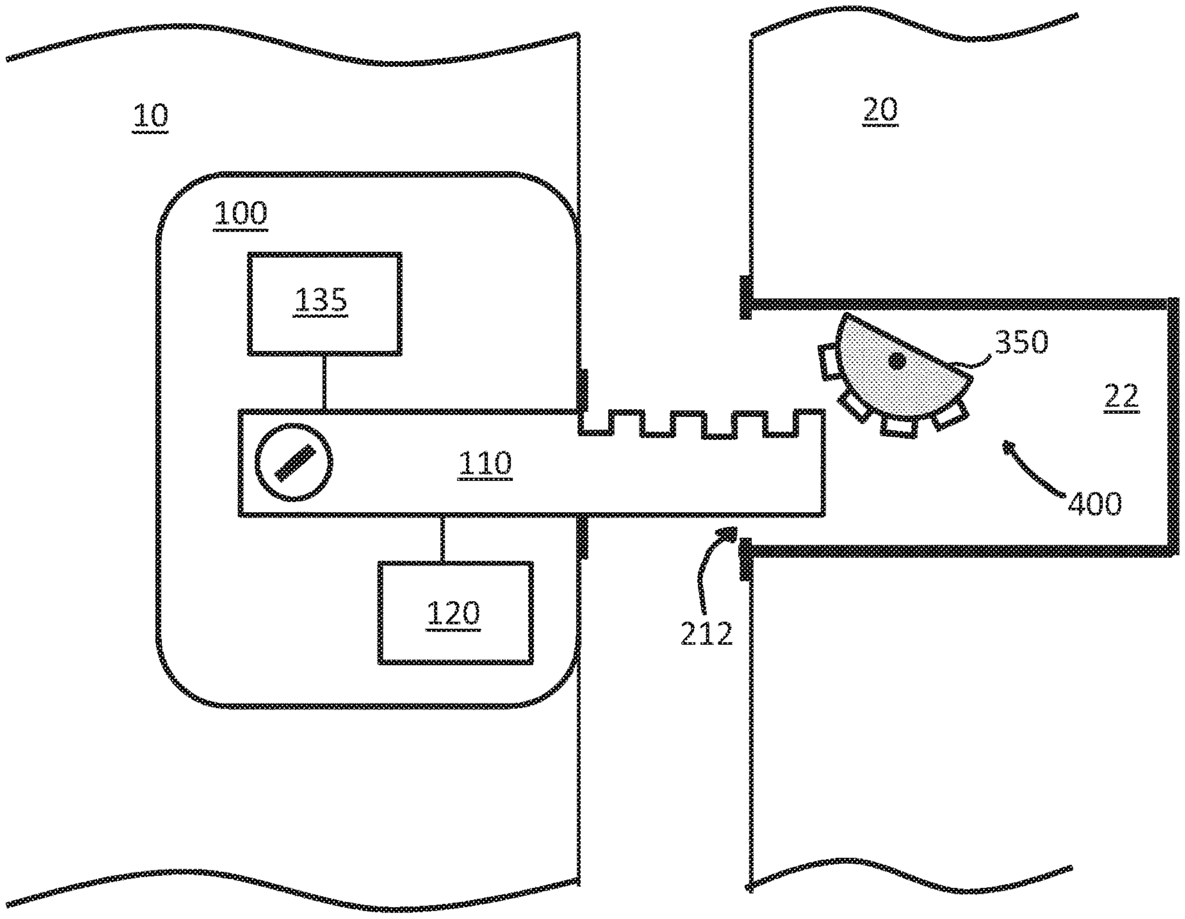
FIG. 18 depicts another embodiment of a door lock detection system according to some aspects.

It should be appreciated that other configurations of the detent may be used. For example, instead of a pawl, the detent may be a wheel (can be a circle, semi-circle or other incompletely circular shape) having teeth that correspond with the protrusions and indentations of, or attached to, the bolt. In some embodiments, the toothed wheel may be spring-biased or otherwise biased to impart vibration to the bolt. One illustrative example of a vibration applicator 400 that is a toothed wheel 350 is shown in FIG. 18. In some embodiments, the detent may be a series of surface features within the door jamb recess that the bolt must slide against during movement of the bolt into the recess.

It should also be appreciated that other types of vibration applicators may be used other than a detent. For example, in some embodiments, the vibration applicator may be a vibrator located within the door jamb recess and positioned such that the bolt slides against the vibrator as it enters the recess. With the vibrator in contact with the bolt, the vibrator may impart vibrations to the bolt. In some embodiments, the vibration applicator may be a tapper located within the door jamb recess that taps on the bolt as the bolt enters the recess. Any other vibration applicator suitable for imparting a vibration to the bolt as the bolt moves into the door jamb recess may be used. In some embodiments, the vibration applicator is configured to be positioned on the door jamb side. In some embodiments, the vibration applicator is configured to be positioned within the door jamb recess.

Figure 19:
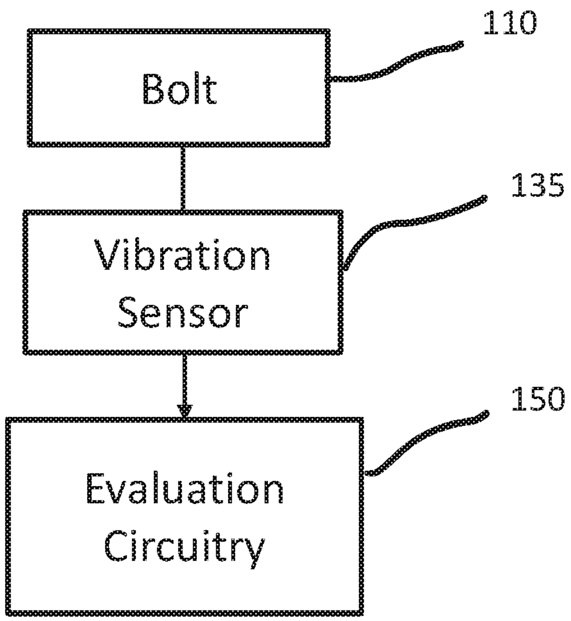
FIG. 19 is a schematic circuit diagram for a door lock detection system using a vibration sensor.

An illustrative circuit diagram for the vibration sensing and comparison operations is shown in FIG. 19. The sensed vibration of the bolt 110 from the vibration sensor 135 is output to evaluation circuitry 150 configured to compare the sensed vibration to a stored expected vibration signature.

In some embodiments, the evaluation circuitry 150 comprises a processor that implements software to compare the sensed vibration to the stored expected vibration signature. As one non-limiting, illustrative embodiment, the software may use Fourier transforms to calculate the differences between the sensed vibration and the expected vibration.

In some embodiments, the evaluation circuitry 150 may comprise a hardware arrangement rather than using software. For example, the evaluation circuitry may comprise a comparator circuit.

In some cases, even if the door lock bolt has been properly advanced into and engaged with the door jamb recess in the locked position, the sensed vibration may not match perfectly with the expected vibration signature. Slight mismatches may arise due to noise, artifacts in the motor, vibration sensor, and the evaluation circuitry, or due to other sources of distortion, even if filters are utilized. In some embodiments, the evaluation circuitry 150 may be configured to determine that the bolt is engaged with the door jamb recess in a locked position when the sensed vibration of the bolt relative to bolt position is within a threshold amount of the expected vibration signature. The threshold amount may be in the form of a percentage, an absolute value, or a combination of both.

The system may use various calculations to determine whether or not a sensed vibration is within a threshold amount. For example, in situations where the difference between the sensed vibration and the expected signature varies along different bolt positions, the system may calculate the difference at each bolt position and take an average. In some embodiments, the threshold may vary along the bolt position. In other words, the tolerance for differences may be greater at certain bolt positions as compared to others. For example, in one embodiment, the threshold is smaller when the bolt is closer to the retracted and extended positions and greater in the positions in-between, or vice versa. In some embodiments, the system only compares a portion of the sensed and expected profiles, rather than the total profiles along the entire bolt position spectrum.

In some embodiments, the expected vibration signature may be stored in the lock detection system at the manufacturing stage. In some embodiments, a user may have the ability to calibrate the expected vibration signature to update the expected signature as parts change over time, due to, e.g., wear and tear.

Automation

According to one aspect, the lock detection systems described herein may be used for automation, e.g., home automation. In some embodiments, the lock detection system may allow a user to remotely monitor and/or control the state of a door lock. In some embodiments, a user may send a signal to a door locking having the lock detection system to lock or unlock the door. The lock detection system of the door lock would then detect whether the door is actually engaged with the door jamb recess in a locked position. A signal would be sent back to the user informing the user as to whether the door is locked or unlocked. In some embodiments, the signals sent between the user and the door lock may be sent via the internet, or other communication modalities such as radiofrequency (RF) or infrared (IR). In some embodiments, the user may interact with a smartphone application to monitor and/or control the door lock.

The lock detection system may be integrated into a larger automation system, for example, ones that also monitor and/or controls lights, heating, cooling, ventilation, lead, smoke and/or carbon monoxide detection and/or video surveillance.

Computing Devices

In some embodiments, techniques described herein may be carried out using one or more computing devices, including, but not limited to, network databases, storage systems, and central plant controllers. For example, the system may include a controller that includes one or more computing devices. Embodiments are not limited to operating with any particular type of computing device.

Figure 20:
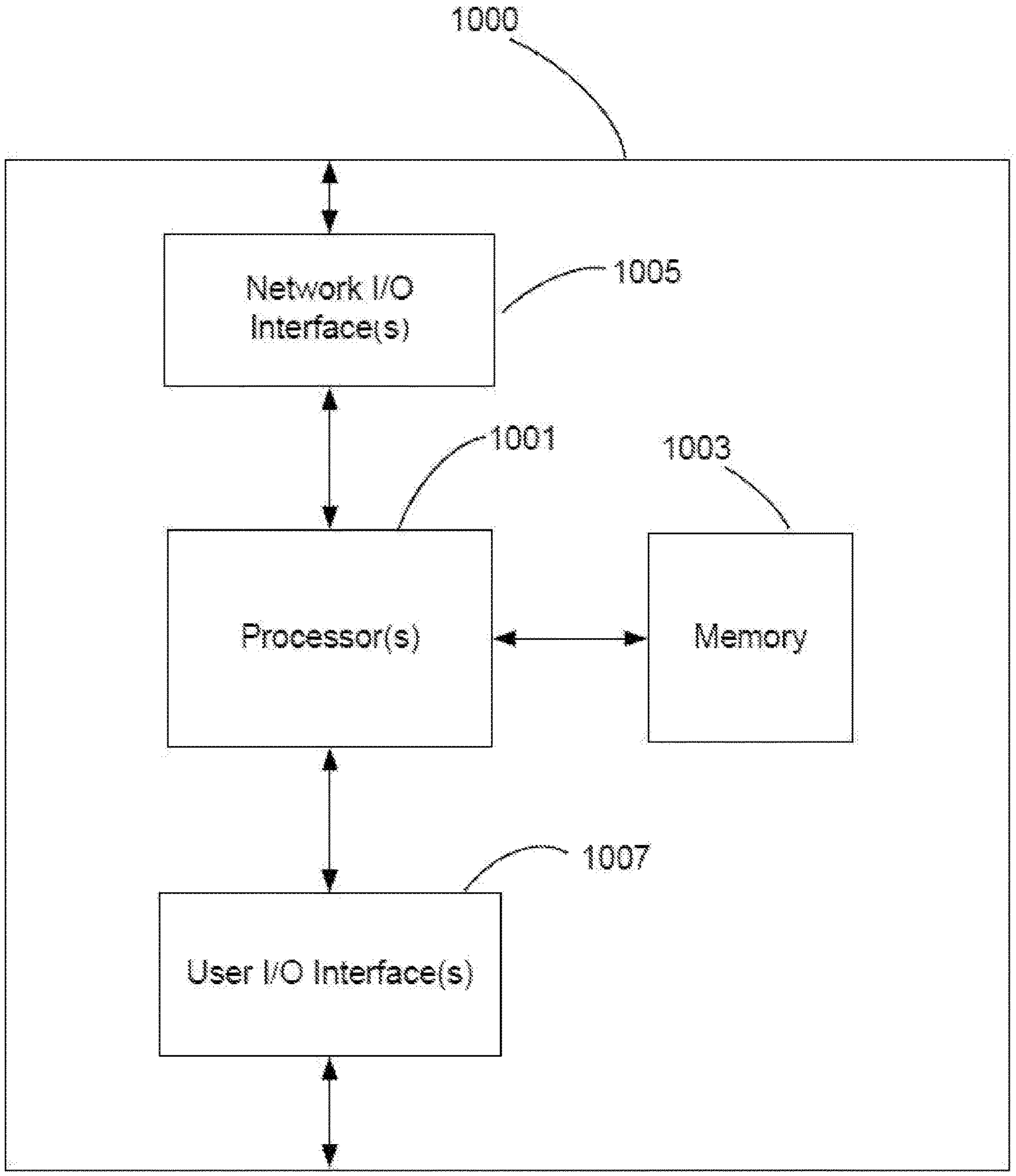
FIG. 20 is a block diagram of an illustrative computing device that may be used to implement a method of detecting whether a door lock bolt is engaged with a door jamb in a locked position.

FIG. 20 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

While the above embodiments are described in reference to a door, it should be appreciated that the same systems can be adapted for use with a window or other fenestrations having an associated openable covering.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of determining a movement of a door lock bolt between a retracted position and a fully extended position, in which the door lock bolt extends through an opening of a door jamb recess, the method comprising:

driving the door lock bolt with a motor to move from the retracted position toward the fully extended position, such that the door lock bolt is moved against a force applied to the door lock bolt by a force applicator;

sensing, with a current sensor, current of the motor during motor driven movement of the door lock bolt toward the fully extended position based on the force applied to the door lock bolt by the force applicator;

comparing the sensed current of the motor to an expected current profile corresponding to the motor driven movement of the door lock bolt; and determining movement of the door lock bolt from the retracted position toward the fully extended position based on the sensed current of the motor being within a threshold amount of the expected current profile.

2. The method of claim 1, wherein the force comprises a variable force relative to bolt position.

3. The method of claim 1, wherein the force applicator comprises a spring.

4. The method of claim 3, wherein a direction of compression of the spring by the door lock bolt as the door lock bolt moves through the opening is parallel to a movement direction of the door lock bolt as the door lock bolt moves through the opening.

5. The method of claim 1, wherein the force applicator comprises a friction pad.

6. The method of claim 1, wherein the force applicator is disposed in the door jamb recess.

7. The method of claim 1, wherein comparing the sensed current of the motor to the expected current profile comprises operating a processor in communication with the current sensor.

8. The method of claim 1, wherein comparing the sensed current of the motor to the expected current profile comprises operating a comparator circuit in communication with the current sensor.

9. The method of claim 1, wherein the expected current profile is stored in evaluation circuitry included in a door lock comprising the door lock bolt.

10. The method of claim 1, wherein the expected current profile corresponds to the motor driven movement of the door lock bolt from the retracted position to the fully extended position.

11. At least one non-transitory computer-readable storage medium having encoded thereon executable instructions that, when executed, cause at least one processor to carry out a method of determining a position of a door lock bolt between a retracted position and a fully extended position, in which the door lock bolt extends through an opening of a door jamb recess, the method comprising:
 operating a motor to drive the door lock bolt to move from the retracted position toward the fully extended position, such that the door lock bolt is moved against a force applied to the door lock bolt by a force applicator;
 measuring, with a current sensor, current of the motor during motor driven movement of the door lock bolt toward the fully extended position based on the force applied to the door lock bolt by the force applicator;
 comparing the sensed current of the motor to an expected current profile corresponding to the motor driven movement of the door lock bolt; and
 determining movement of the door lock bolt from the retracted position toward the fully extended position based on the sensed current of the motor being within a threshold amount of the expected current profile.

12. A method of confirming movement of a door lock bolt from a retracted position to a fully extended position, in which the door lock bolt extends through an opening of a door jamb recess, the method comprising:
 operating a motor configured to drive the door lock bolt to move from the retracted position toward the fully extended position, such that the door lock bolt is moved against a force applied to the door lock bolt by a force applicator;
 sensing, with a current sensor, current of the motor during motor driven movement of the door lock bolt toward the fully extended position based on the force applied to the door lock bolt by the force applicator;
 generating a sensed current profile based on the sensed current of the motor during motor driven movement of the door lock bolt toward the fully extended position;
 comparing the sensed current profile to an expected current profile corresponding to the motor driven movement of the door lock bolt; and
 determining movement of the door lock bolt from the retracted position toward the fully extended position based on a plurality of portions of the sensed current profile being within a threshold amount of a corresponding plurality of portions of the expected current profile.

13. The method of claim 12, wherein the force comprises a variable force relative to bolt position.

14. The method of claim 12, wherein the force applicator comprises a spring.

15. The method of claim 14, wherein a direction of compression of the spring by the door lock bolt as the door lock bolt moves through the opening is parallel to a movement direction of the door lock bolt as the door lock bolt moves through the opening.

16. The method of claim 12, wherein comparing the sensed current profile to the expected current profile comprises operating a processor in communication with the current sensor.

17. The method of claim 12, wherein comparing the sensed current of the motor to the expected current profile corresponding to motor driven movement of the door lock bolt comprises operating a comparator circuit in communication with the current sensor.

18. The method of claim 12, wherein the expected current profile is stored in evaluation circuitry included in a door lock comprising the door lock bolt.

19. The method of claim 12, wherein the expected current profile corresponds to the motor driven movement of the door lock bolt from the retracted position to the fully extended position.

20. The method of claim 12, wherein the force applicator is disposed in the door jamb recess.

* * * * *